(12) United States Patent  
Peng et al.

(10) Patent No.: US 11,838,803 B2  
(45) Date of Patent: Dec. 5, 2023

(54) RESOURCE RESERVING METHOD AND DEVICE

(71) Applicant: VIVO MOBILE COMMUNICATION CO., LTD., Chang'an Dongguan (CN)

(72) Inventors: Shuyan Peng, Chang'an Dongguan (CN); Zichao Ji, Chang'an Dongguan (CN); Wei Jiang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 170 days.

(21) Appl. No.: 17/360,616

(22) Filed: Jun. 28, 2021

(65) Prior Publication Data

US 2021/0329502 A1   Oct. 21, 2021

Related U.S. Application Data

(63) Continuation of application No. PCT/CN2019/105766, filed on Sep. 12, 2019.

(30) Foreign Application Priority Data

Dec. 28, 2018  (CN) .......................... 201811627352.4

(51) Int. Cl.  
*H04W 28/26* (2009.01)  
*H04W 28/02* (2009.01)  
*H04W 92/18* (2009.01)

(52) U.S. Cl.  
CPC ....... *H04W 28/26* (2013.01); *H04W 28/0263* (2013.01); *H04W 28/0268* (2013.01); *H04W 92/18* (2013.01)

(58) Field of Classification Search  
CPC ............. H04W 28/26; H04W 28/0263; H04W 28/0268; H04W 92/18  
See application file for complete search history.

(56) References Cited

U.S. PATENT DOCUMENTS

2017/0041902 A1   2/2017  Sheng  
2017/0325214 A1  11/2017  Lu et al.  
(Continued)

FOREIGN PATENT DOCUMENTS

CN    101431774 A    5/2009  
CN    101754280 A    6/2010  
(Continued)

OTHER PUBLICATIONS

International Search Report & Written Opinion related to Application No. PCT/CN2019/105766; dated Nov. 28, 2019.  
First Chinese Office Action for related Application No. 201811627352.4; dated Dec. 3, 2021.  
Ericsson, "Radio Resource Management for NR Sidelink Communication", Aug. 20-24, 2018, 3GPP TSG-RAN WG1 Meeting #94, Göteborg, Sweden.  
(Continued)

*Primary Examiner* — Mewale A Ambaye  
(74) *Attorney, Agent, or Firm* — von Briesen & Roper, s.c.

(57) ABSTRACT

The embodiments of this application disclose a resource reserving method and a device and relate to the field of communications technologies. The method includes: obtaining target information, where the target information includes at least one of first information and second information, the first information is used to indicate a resource reserving priority of first data, the second information is used to indicate a resource reserving priority of second data, the first data is data that occupies a first resource, and the second data is to-be-transmitted data; and according to the target information, determining whether to use the first resource as a candidate resource for transmitting the second data. The embodiments of this application are applied to a scenario where UE reserves a resource for to-be-transmitted data.

17 Claims, 7 Drawing Sheets

(56) References Cited

U.S. PATENT DOCUMENTS

| | | | |
|---|---|---|---|
| 2018/0063852 A1 | 3/2018 | Kang et al. | |
| 2020/0112873 A1 | 4/2020 | Zhu et al. | |
| 2020/0134916 A1* | 4/2020 | Piya | G06F 3/04845 |
| 2020/0314939 A1* | 10/2020 | Park | H04W 72/12 |
| 2020/0396756 A1 | 12/2020 | Xu et al. | |
| 2020/0403737 A1* | 12/2020 | Yeo | H04L 1/1861 |

FOREIGN PATENT DOCUMENTS

| | | | | |
|---|---|---|---|---|
| CN | 104883746 A | 9/2015 | | |
| CN | 108141847 A | 6/2018 | | |
| CN | 108770070 A | 11/2018 | | |
| CN | 109005527 A | 12/2018 | | |
| KR | 20160131740 A | 11/2016 | | |
| WO | 2017133334 A1 | 8/2017 | | |
| WO | 2018062832 A1 | 4/2018 | | |
| WO | 2020064325 A1 | 4/2020 | | |
| WO | 2020068991 A1 | 4/2020 | | |
| WO | WO-2020064325 A1 * | 4/2020 | | H04W 28/0268 |
| WO | WO-2020068991 A1 * | 4/2020 | | H04W 4/40 |

OTHER PUBLICATIONS

Ericsson, "On Mode 2 Resource Allocation for NR Sidelink", Oct. 8-12, 2018, 3GPP TSG-RAN WG1 Meeting #94-Bis, Chengdu, China.

Vivo, "Discussion on resource allocation mechanism for NR V2X", Nov. 12-16, 2018, 3GPP TSG RAN WG1 Meeting #95, Spokane, USA.

Fujitsu, "Resource Allocation for NR V2X Sidelink Communication", Nov. 12-16, 2018, 3GPP TSG RAN WG1 Meeting #95, Spokane, USA.

Interdigital Inc., "Resource Allocation Features to Support NR V2X Requirements", Oct. 8-12, 2018, 3GPP RAN WG2 Meeting #103bis, Chengdu, China.

Extended European search report related to Application No. 19905683.9 dated Feb. 11, 2022.

R1-1813164, Source: InterDigital Inc., "Resource Allocation for NR V2X" Document for: Discussion, Decision, Agenda item: 7.2.4.1.4, Release: 3GPP RAN WG1 Meeting #95, Nov. 12-16, 2018, Spokane, USA.

South Korean Request for the Submission of an Opinion for related Application No. 10-2021-7023329; reported on Sep. 30, 2023.

* cited by examiner

RESOURCE RESERVING METHOD AND DEVICE

This application is a continuation application of a PCT Application No. PCT/CN2019/105766 filed on Sep. 12, 2019, which claims priority to Chinese Patent Application No. 201811627352.4, filed with the China National Intellectual Property Administration on Dec. 28, 2018, and entitled "RESOURCE RESERVING METHOD AND DEVICE", which are incorporated herein by reference in their entireties.

TECHNICAL FIELD

Embodiments of this application relate to the field of communications technologies, and in particular, to a resource reserving method and a device.

BACKGROUND

A long term evolution (LTE) system supports sidelink transmission, that is, user equipment (UE) may perform direct data transmission with each other without using a network device.

At present, before using a sidelink to transmit data, UE may autonomously select a transmission resource. For example, the UE may first receive control information sent by another UE, then exclude, according to the control information and measured reference signal received power, a transmission resource reserved by another UE, select a resource that meets a preset condition (for example, low signal interference strength) from transmission resources that remain after the exclusion as candidate resources, and finally select a resource from the candidate resources as a transmission resource.

However, the above method is generally applicable to exclude a transmission resource used to transmit broadcast-type data in an LTE system, and in a fifth-generation (5-Generation, 5G) new radio (NR) system, the UE may use a sidelink to transmit another type of data (for example, unicast-type data or multicast-type data). According to the above method, the UE may exclude transmission resources reserved by another UE for various types of data, resulting in low transmission efficiency of a transmission resource.

SUMMARY

The embodiments of this application provide a resource reserving method and a device, which may solve the problem that UE may exclude transmission resources reserved by another UE for various types of data, resulting in low transmission efficiency of a transmission resource.

According to a first aspect, the embodiments of this application provide a resource reserving method. The method may be applied to UE. The method may include: obtaining target information, where the target information includes at least one of first information and second information, the first information is used to indicate a resource reserving priority of first data, the second information is used to indicate a resource reserving priority of second data, the first data is data that occupies a first resource, and the second data is to-be-transmitted data; and according to the target information, determining whether to use the first resource as a candidate resource for transmitting the second data.

According to a second aspect, the embodiments of this application provide UE. The UE may include: an obtaining unit and a determining unit. The obtaining unit is configured to obtain target information, where the target information includes at least one of first information and second information, the first information is used to indicate a resource reserving priority of first data, the second information is used to indicate a resource reserving priority of second data, the first data is data that occupies a first resource, and the second data is to-be-transmitted data. The determining unit is configured to: according to the target information obtained by the obtaining unit, determine whether to use the first resource as a candidate resource for transmitting the second data.

According to a third aspect, the embodiments of this application provide UE, including: a processor, a memory, and a computer program stored in the memory and executable on the processor, where the computer program, when executed by the processor, implements the steps of the resource reserving method according to the foregoing first aspect.

According to a fourth aspect, the embodiments of this application provide a non-transitory computer-readable storage medium, where a computer program is stored in the non-transitory computer-readable storage medium, and the computer program, when executed by a processor, implements the steps of the resource reserving method according to the foregoing first aspect.

In the embodiments of this application, target information may be obtained, where the target information includes at least one of first information and second information, the first information is used to indicate a resource reserving priority of first data, the second information is used to indicate a resource reserving priority of second data, the first data is data that occupies a first resource, and the second data is to-be-transmitted data; and according to the target information, it is determined whether to use the first resource as a candidate resource for transmitting the second data. In this solution, the resource reserving priority of the first data and/or the second data may be determined according to the target information, and it may be determined whether the first resource reserved for the first data is used as the candidate resource for transmitting the second data. Therefore, when service types of the first data and the second data are the same or different, the first resource may be used as the candidate resource for transmitting the second data, instead of simply excluding resources of various types of services, which may improve transmission efficiency of a transmission resource.

DETAILED DESCRIPTION OF EMBODIMENTS

Figure 1:
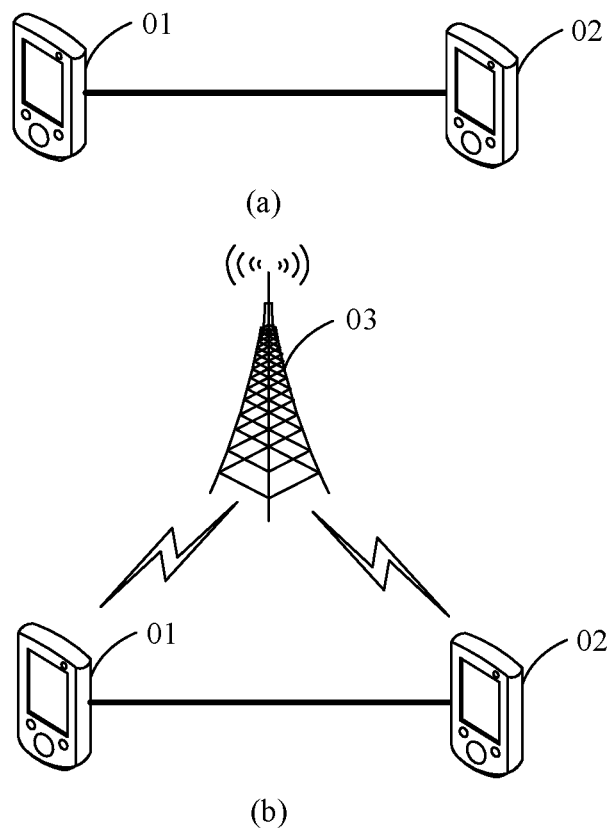
FIG. 1 is a schematic architectural diagram of a communications system according to an embodiment of this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of the embodiments of this application, the terms such as "first" and "second" are used to distinguish between different objects, but are not used to describe a particular sequence of the objects. For example, a first transmission priority, a second transmission priority, and the like are used to distinguish between different transmission priorities, but are not used to describe a particular sequence of the transmission priorities. In the description of the embodiments of this application, unless otherwise specified, the meaning of "a plurality of" means two or more.

The term "and/or" in this specification describes an association relationship of associated objects, indicating that three relationships may exist. For example, A and/or B may indicate three cases: Only A exists, both A and B exist, and only B exists. A character "/" in this specification indicates an "or" relationship between associated objects. For example, AB indicates A or B.

In the embodiments of this application, the term such as "exemplary" or "for example" is used to indicate an example, an instance, or a description. Any embodiment or design scheme described as "exemplary" or "an example" in the embodiments of this application should not be construed as being preferable or advantageous than other embodiments or design schemes. Specifically, the words such as "exemplary" or "for example" are used to present related concepts in a specific manner.

The following describes some concepts and/or terms related in the resource reserving method and the device provided in the embodiments of this application.

A sidelink is a link between UEs for data transmission, that is, UEs can directly transmit data without a network device, for example, UEs can directly transmit data on a physical layer. For example, the UE can transmit sidelink control information (SCI) through a physical sidelink control channel (PSCCH), and schedule transmission of a physical sidelink shared channel (PSSCH) to transmit data.

Current sidelink transmission can be divided into transmission manners such as broadcast, multicast, and unicast.

A process in which UE transmits information with another UE on a sidelink is referred to as sidelink communication. Sidelink communication can include communication such as device-to-device (D2D) communication and vehicle-to-everything (V2X) communication. V2X mainly includes vehicle-to-vehicle (V2V) communication, vehicle-to-infrastructure (V2I) communication, vehicle-to-network (V2N) communication, and vehicle-to-pedestrian (V2P) communication.

A proximity-based services per-packet priority (PPPP) may be divided into multiple groups. A smaller value of PPPP indicates a higher transmission priority of a data packet. One data packet may correspond to one or multiple PPPPs. For example, the PPPP may be divided into 8 groups with values ranging from 0 to 7. If the value of PPPP is 0, a data packet has a higher transmission priority, and if the value of PPPP is 7, a data packet has a lower transmission priority.

Quality of service (QoS) is a security mechanism in the network, is a technology used to solve problems such as latency and congestion in the network, and may provide a better service capability for network communication. It should be noted that in the embodiments of this application, a QoS parameter configuration may include one or a combination of multiple of the following QoS parameters or an index value of the combination: a data packet or data stream priority, a data packet or data stream latency, data package or data stream reliability, a data package or data stream communication range, a data package or data stream payload (Payload), a data package or data stream transmission rate, and a data packet or data stream data rate. It may be understood that the QoS parameter configuration may also include other possible QoS parameters. This may be specifically determined according to an actual usage requirement, and is not limited in the embodiments of this application.

In the embodiments of this application, the resource reserving method and the device are provided, target information may be obtained, where the target information includes at least one of first information and second information, the first information is used to indicate a resource reserving priority of first data, the second information is used to indicate a resource reserving priority of second data, the first data is data that occupies a first resource, and the second data is to-be-transmitted data; and according to the target information, it is determined whether to use the first resource as a candidate resource for transmitting the second data. In this solution, the resource reserving priority of the first data and/or the second data may be determined according to the target information, and it may be determined whether the first resource reserved for the first data is used as the candidate resource for transmitting the second data. Therefore, when service types of the first data and the second data are the same or different, the first resource may be used as the candidate resource for transmitting the second data, instead of simply excluding resources of various types of services, which may improve transmission efficiency of a transmission resource.

The resource reserving method and the device provided in the embodiments of this application may be applied to a communications system. Specifically, it may be applied to a scenario where UE reserves a resource for to-be-transmitted data.

Optionally, in the embodiments of this application, the communication system may be a 5G NR V2X system or other possible systems.

For example, FIG. 1 is a schematic architectural diagram of two communications systems according to an embodiment of this application. As shown in (a) in FIG. 1, the communications system may include: UE 01 and UE 02. A connection can be established between UE 01 and UE 02 for communication. As shown in (b) in FIG. 1, the communications system may include: UE 01, UE 02, and an access network device 03. A connection can be established between the UE 01 and the access network device 03 for communication, a connection can be established between the UE 02 and the access network device 03 for communication, and a connection can be established between the UE 01 and the UE 02 for communication. It should be noted that the communication between the UE 01 and the UE 02 can be referred to as sidelink communication.

It should be noted that a resource selection mode in the embodiment of the present application is an autonomous resource selection mode. In the autonomous resource selection mode, there can be base station coverage or there can be no base station coverage.

To indicate a connection relationship between the UE 01 and the UE 02 more clearly, in FIG. 1, a solid line is used to indicate the connection relationship between the UE 01 and the UE 02. In actual implementation, as shown in FIG. 1, the UE 01 and the UE 02 may be wirelessly connected.

UE is a device providing voice and/or data connectivity to a user, a handheld device having a wired/wireless connection function, or other processing devices connected to a wireless modem. UE may communicate with one or more core network devices through a radio access network (RAN). UE may be a mobile terminal such as a mobile phone (or referred to as a "cellular" phone) or a computer having a mobile terminal, or may be a portable, pocket-sized, handheld, computer built-in, or vehicle-mounted mobile apparatus, which exchanges language and/or data with the RAN. For example, the UE is a device such as a personal communication service (PCS) phone, a cordless phone, a session initiation protocol (SIP) phone, a wireless local loop (WLL) station, or a personal digital assistant (PDA), and so on. The UE may be alternatively referred to as a user agent or a terminal device.

An access network device may be a base station. The base station is an apparatus deployed in the RAN to provide a wireless communication function for the UE. The base station may include various forms of macro base stations, micro base stations, relay stations, access points, and the like. In systems using different radio access technologies, names of devices having base station functions may be different. For example, in a fifth-generation (5G) network, the device is referred to as a gNB; in an LTE system, the device is referred to as an evolved NodeB (eNB or eNodeB); and in a third-generation (3-Generation, 3G) network, the device is referred to as a node B. With evolution of the communications technologies, the name of the "base station" may change.

With reference to the accompanying drawings, the following describes in detail the resource reserving method and the device in the embodiments of this application based on specific embodiments and application scenarios.

Figure 2:
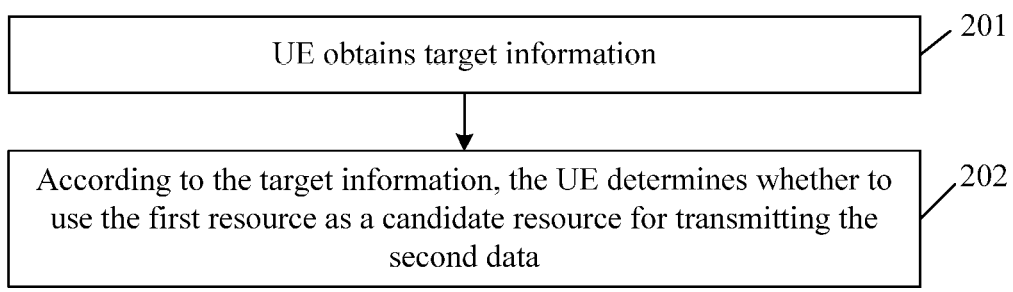
FIG. 2 is a first schematic diagram of a resource reserving method according to an embodiment of this application.

Based on the communication system as shown in FIG. 1, the embodiments of this application provide a resource reserving method. As shown in FIG. 2, the resource reserving method may be applied to user equipment UE, and may include the following steps 201 and 202.

Step 201: UE obtains target information.

The target information may include at least one of first information and second information. The first information may be used to indicate a resource reserving priority of the first data. The second information is used to indicate a resource reserving priority of the second data. The first data is data that occupies a first resource. The second data is to-be-transmitted data.

Optionally, in the embodiments of this application, the first data and the second data may be data packets or data streams.

Optionally, in the embodiments of this application, the first information may include at least one of the following: a service type of the first data, a QoS parameter of the first data, and a mapping parameter of the first data. The second information may include at least one of the following: a service type of the second data, a QoS parameter of the second data, and a mapping parameter of the second data. The mapping parameter of the first data may be a signal quality value of the first data, and the mapping parameter of the second data may be a signal quality threshold obtained by mapping the QoS parameter of the first data and the QoS parameter of the second data.

Optionally, a service type is any one of the following: broadcast signaling, RRC signaling, broadcast service data, multicast service data, and unicast service data. The broadcast signaling can be system information block (SIB) signaling and the like.

Optionally, the QoS parameter of the first data may include a PPPP parameter of the first data, and the QoS parameter of the second data may include a PPPP parameter of the second data.

Optionally, the mapping parameter of the first data may be specifically reference signal received power (RSRP) of the first data, and the mapping parameter of the second data may be specifically a signal quality threshold obtained by mapping the PPPP parameter of the first data and the PPPP parameter of the second data.

Optionally, when the target information includes the first information, the first information may specifically be any one of the following:

(1) The first information includes the service type of the first data.

(2) The first information includes the QoS parameter of the first data.

(3) The first information includes a service type of the first data and a QoS parameter of the first data.

Optionally, when the target information includes the second information, the second information may specifically be any one of the following:

(1) The second information includes the service type of the second data.

(2) The second information includes the QoS parameter of the second data.

(3) The second information includes a service type of the second data and a QoS parameter of the second data.

Optionally, when the target information includes the first information and the second information, the first information and the second information may specifically be any one of the following:

(1) The first information includes a service type of the first data, and the second information includes a service type of the second data.

(2) The first information includes a QoS parameter of the first data, and the second information includes a QoS parameter of the second data.

(3) The first information includes a mapping parameter of the first data, and the second information includes a mapping parameter of the second data.

(4) The first information includes a service type of the first data and a QoS parameter of the first data, and the second information includes a service type of the second data and a QoS parameter of the second data.

(5) The first information includes a service type of the first data and a mapping parameter of the first data, and the second information includes a service type of the second data and a mapping parameter of the second data.

Optionally, in the embodiments of this application, the service type of the first data may be indicated by radio resource control (RRC) signaling, SCI, or downlink control information (DCI). Specifically, the service type of the first data may be indicated by any one of the following three manners:

Manner 1: The service type of the first data is explicitly indicated.

For example, the service type of the first data is indicated by DCI. The DCI may include 2 bits, and the 2 bits may be used to indicate that the service type of the first data is broadcast service data, multicast service data, and unicast service data. For example, 01 may indicate broadcast service data, 10 may indicate multicast service data, and 11 may indicate unicast service data.

Manner 2: The service type of the first data is implicitly indicated.

For example, the service type of the first data may be specifically indicated by configuration information of RRC signaling, SCI, or DCI. If the configuration information includes a UE ID or unicast feedback information, UE may determine that the service type of the first data is a unicast service. If the configuration information includes a configuration group ID or group feedback information, UE may determine that the service type of the first data is a unicast service. If the configuration information does not include a UE ID or a group ID, UE may determine that the service type of the first data is a broadcast service.

Manner 3: Joint coding with another field.

In the embodiments of this application, joint coding means that a code point of a field value indicated by RRC signaling, SCI, or DCI and another field value (for example, feedback information configuration) may be jointly coded. The code point of the field value indicated by RRC signaling, SCI, or DCI may clearly indicate that the service type of the first data is unicast, multicast, or broadcast.

Optionally, in the embodiments of this application, a resource reserving priority of data is predefined in a communication protocol, or preconfigured by UE or configured by UE, or preconfigured by a network device or configured by a network device.

For example, the network device may preconfigure that a descending order of reserved priorities of broadcast service data, multicast service data, and unicast service data is: a reserved priority of broadcast service data>a reserved priority of multicast service data>a reserved priority of unicast service data.

For example, the network device may preconfigure that a descending order of reserved priorities of broadcast signaling, RRC signaling, broadcast service data, multicast service data, and unicast service data may be: a reserved priority of broadcast signaling>a reserved priority of RRC signaling>a reserved priority of broadcast service data>a reserved priority of multicast service data>a reserved priority of unicast service data.

For example, the network device may preconfigure that a descending order of reserved priorities of broadcast signaling, RRC signaling, broadcast service data, multicast service data, and unicast service data may be: a reserved priority of broadcast signaling=a reserved priority of RRC signaling>a reserved priority of broadcast service data=a reserved priority of multicast service data=a reserved priority of unicast service data.

Optionally, in the embodiments of this application, a reserving priority of a signaling radio bearer is higher than a reserving priority of a data radio bearer.

Optionally, in the embodiments of this application, the UE may specifically obtain the target information in any one of the following possible implementations:

In a first possible implementation, the target information includes the first information. Optionally, before the UE and another UE transmit to-be-transmitted data (that is, the second data) through a sidelink, the UE may perform sensing, according to detected control information, obtain a resource reserving priority of data (that is, the first data) that occupies the first resource, and according to the resource reserving priority of the first data, determine whether to use the first resource occupied by the first data as a candidate resource of the second data.

In a second possible implementation, the target information includes the second information. Optionally, before the UE and another UE transmit to-be-transmitted data (that is, the second data) through a sidelink, the UE may obtain a resource reserving priority of the second data, and according to the resource reserving priority of the second data, determine whether to use the first resource occupied by the first data as a candidate resource for transmitting the second data.

In a third possible implementation, the target information includes the first information and the second information. Optionally, before the UE and another UE transmit to-be-transmitted data (that is, the second data) through a sidelink, the UE may obtain a resource reserving priority of the second data, perform sensing, according to detected control information, obtain a resource reserving priority of data (that is, the first data) that occupies the first resource, and according to the resource reserving priority of the first data and the resource reserving priority of the second data, determine whether to use the first resource reserved for the first data as a candidate resource for transmitting the second data.

Optionally, the control information may be SCI, sidelink assignment (SA) information, and the like.

Step 202: According to the target information, the UE determines whether to use the first resource as a candidate resource for transmitting the second data.

In the embodiments of this application, the UE may determine to use the first resource as the candidate resource according to the target information; or determine not to use the first resource as the candidate resource according to the target information.

Optionally, in the embodiments of this application, the candidate resource may be a candidate resource set, and the candidate resource set may include one or more resources. Optionally, if the UE determines to use the first resource as the candidate resource, the first resource may be a resource in the candidate resource set.

For example, it is assumed that the candidate resource set is an empty set, and the empty set does not include the first resource. If the UE determines to use the first resource as the candidate resource, the UE may reserve the first resource in the candidate resource set. If the UE determines not to use the first resource as the candidate resource, the UE may not perform a processing action.

For example, it is assumed that the candidate resource set is a union set, and the union set includes the first resource. If the UE determines to use the first resource as the candidate resource, the UE may not perform a processing action. If the UE determines not to use the first resource as the candidate resource, the UE may exclude the first resource from the candidate resource set.

Optionally, in the embodiments of this application, after the UE determines the candidate resource set, the UE may randomly select a resource from the candidate resource set as a reserved resource. For specifics, refer to related technologies, and details are not described in the embodiments of this application.

The embodiments of this application provide the resource reserving method, the resource reserving priority of the first data and/or the second data may be determined according to the target information, and it may be determined whether the first resource reserved for the first data is used as the candidate resource for transmitting the second data. Therefore, when service types of the first data and the second data are the same or different, the first resource may be used as the candidate resource for transmitting the second data, instead of simply excluding resources of various types of services, which may improve transmission efficiency of a transmission resource.

Figure 3:
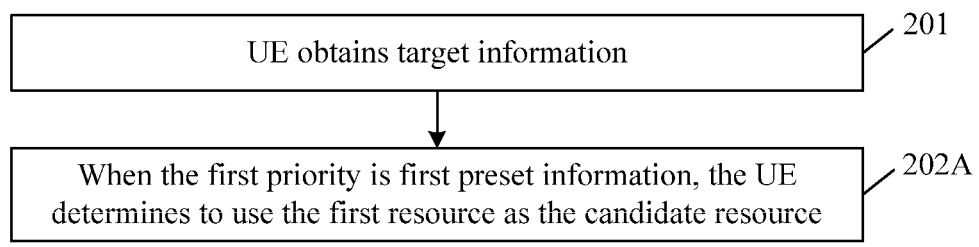
FIG. 3 is a second schematic diagram of a resource reserving method according to an embodiment of this application.

Optionally, with reference to FIG. 2, as shown in FIG. 3, when the target information includes the first information, the foregoing step 202 may be specifically implemented in the following step 202A.

Step 202A: When the first priority is first preset information, the UE determines to use the first resource as the candidate resource.

A resource reserving priority indicated by the first preset information may be a lowest priority.

It may be understood that in the embodiments of this application, when the first information is different from the first preset information, the UE may determine not to use the first resource as the candidate resource.

Optionally, in the embodiments of this application, the target information may further include second information.

Optionally, in the embodiments of this application, the first information may include at least one of a service type of the first data and a QoS parameter of the first data.

Optionally, in the embodiments of this application, the first preset information may be a preset service type, or may be a preset QoS parameter (for example, a preset PPPP parameter).

For example, in illustrative descriptions, the first preset information is a first preset service type. It is assumed that the first preset service type is unicast service data, and a resource reserving priority indicated by the unicast service data is a lowest priority. If the service type of the first data is unicast service data, the UE may determine to use the first resource as the candidate resource. If the service type of the first data is broadcast service data or multicast service data, the UE may determine not to use the first resource as the candidate resource.

For example, in illustrative descriptions, the first preset information is a first preset PPPP parameter. It is assumed that the value of the first preset PPPP parameter is 7, and when the value of the first preset PPPP parameter is 7, it indicates that the resource reserving priority is a lowest priority. If the value of the QoS parameter of the first data is 7, the UE may determine to use the first resource as the candidate resource. If the value of the QoS parameter of the first data is less than 7 (for example, the value is 5), the UE may determine not to use the first resource as the candidate resource.

In the resource reserving method provided in the embodiments of this application, when the resource reserving priority indicated by the first information is the lowest priority, the UE may directly use the first resource occupied by the first data as the candidate resource for transmitting the second data, there is no need to obtain the resource reserving priority of the second data, and the resource reserving priority of the first data is compared with the resource reserving priority of the second data, so that a resource reserving step may be simplified.

Figure 4:
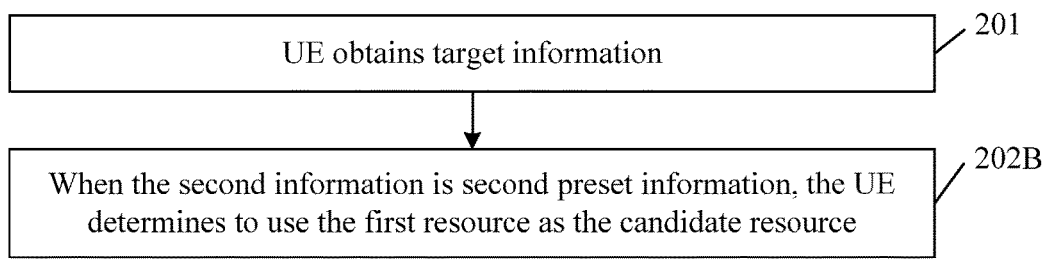
FIG. 4 is a third schematic diagram of a resource reserving method according to an embodiment of this application.

Optionally, with reference to FIG. 2, as shown in FIG. 4, when the target information includes the second information, the foregoing step 202 may be specifically implemented in the following step 202B.

Step 202B: When the second information is second preset information, the UE determines to use the first resource as the candidate resource.

A resource reserving priority indicated by the second preset information may be a highest priority.

It may be understood that in the embodiments of this application, when the second information is different from the second preset information, the UE may determine not to use the first resource as the candidate resource.

Optionally, in the embodiments of this application, the target information may further include the first information.

Optionally, in the embodiments of this application, the second information may include at least one of a service type of the second data and a QoS parameter of the second data.

Optionally, in the embodiments of this application, the second preset information may be a preset service type, or may be a preset QoS parameter (for example, a preset PPPP parameter).

For example, in illustrative descriptions, the second preset information is a second preset service type. It is assumed that the second preset service type is broadcast signaling, and a resource reserving priority indicated by the broadcast signaling is a highest priority. If the service type of the second data is broadcast signaling, the UE may determine to use the first resource as the candidate resource. If the service type of the second data is RRC signaling, broadcast service data, multicast service data, or unicast service data, the UE may determine not to use the first resource as the candidate resource.

For example, in illustrative descriptions, the second preset information is a second preset PPPP parameter. It is assumed that the value of the second preset PPPP parameter is 0, and when the value of the second preset PPPP parameter is 0, it indicates that the resource reserving priority is a highest priority. If the value of the QoS parameter of the second data is 0, the UE may determine to use the first resource as the candidate resource. If the value of the QoS parameter of the second data is greater than 0 (for example, the value is 2), the UE may determine not to use the first resource as the candidate resource.

In the resource reserving method provided in the embodiments of this application, when the resource reserving priority indicated by the second information is the highest priority, the UE may directly use the first resource occupied by the first data as the candidate resource for transmitting the second data, there is no need to obtain the resource reserving priority of the first data, and the resource reserving priority of the first data is compared with the resource reserving priority of the second data, so that the resource reserving method may be simplified.

Figure 5:
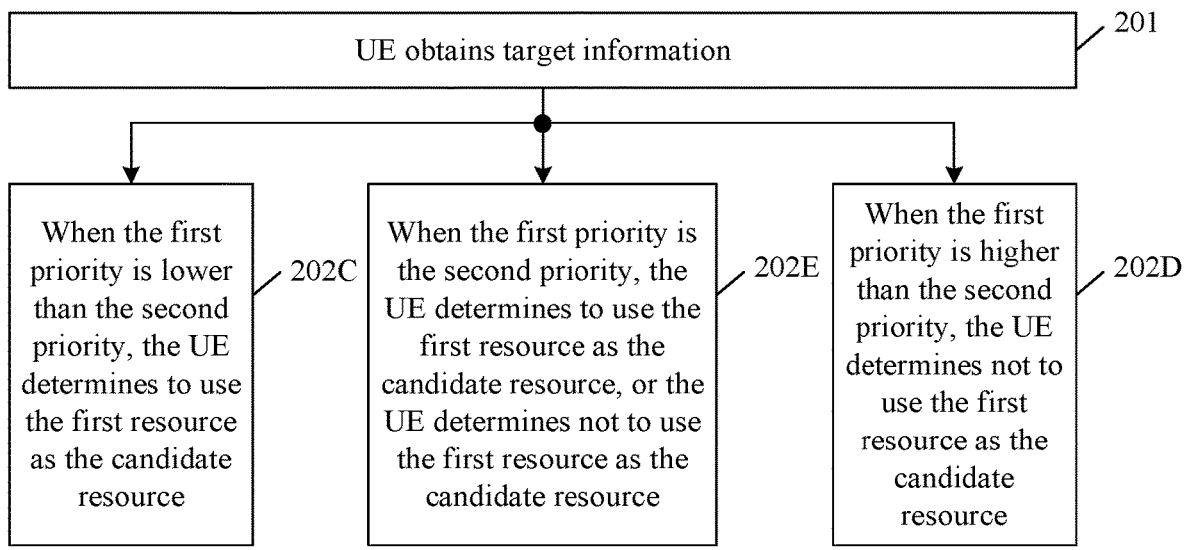
FIG. 5 is a fourth schematic diagram of a resource reserving method according to an embodiment of this application.

Optionally, with reference to FIG. 2, as shown in FIG. 5, when the target information includes the first information and second information, the first information includes the service type of the first data, and the second information includes the service type of the second data, the foregoing step 202 may be specifically implemented in the following step 202C, step 202D, or step 202E.

Step 202C: When the first priority is lower than the second priority, the UE determines to use the first resource as the candidate resource.

Step 202D: When the first priority is higher than the second priority, the UE determines not to use the first resource as the candidate resource.

Step 202E: When the first priority is equal to the second priority, the UE determines to use the first resource as the candidate resource, or the UE determines not to use the first resource as the candidate resource.

The first priority may be a resource reserving priority indicated by the service type of the first data. The second priority may be a resource reserving priority indicated by the service type of the second data.

For example, in the following illustrative descriptions, a descending order of reserved priorities is: a reserved priority of broadcast signaling>a reserved priority of RRC signaling>a reserved priority of broadcast service data>a reserved priority of multicast service data>a reserved priority of unicast service data, and the service type of the second data is RRC signaling.

(1) If the service type of the first data is broadcast service data, multicast service data or unicast service data, because the resource reserving priority (that is, the first priority) indicated by the service type of the first data is lower than a resource reserving priority (that is, the second priority) indicated by the service type of the second data, the UE may determine to use the first resource as the candidate resource.

Optionally, if the candidate resource set is an empty set and the empty set does not include the first resource, the UE may reserve the first resource in the candidate resource set; if the candidate resource set is a union set and the union set includes the first resource, the UE may not perform a processing action.

(2) If the service type of the first data is broadcast signaling, because the resource reserving priority (that is, the first priority) indicated by the service type of the first data is higher than the resource reserving priority (that is, the second priority) indicated by the service type of the second data, the UE may determine not to use the first resource as the candidate resource.

Optionally, if the candidate resource set is an empty set and the empty set does not include the first resource, the UE may not perform a processing action; if the candidate resource set is a union set and the union set includes the first resource, the UE may exclude the first resource from the candidate resource set.

(3) If the service type of the first data is RRC signaling, because the resource reserving priority (that is, the first priority) indicated by the service type of the first data is equal to the resource reserving priority (that is, the second priority) indicated by the service type of the second data, the UE may determine to use the first resource as the candidate resource, or determine not to use the first resource as the candidate resource.

Optionally, in the embodiments of this application, the service type of the first data may include at least one first service type, and the service type of the second data may include at least one second service type.

It should be noted that the first service type and the second service type may be the same service type, or may be different service types. This may be specifically determined according to an actual usage requirement, and is not limited in the embodiments of this application.

For example, the service type of the first data may include RRC signaling, and the service type of the second data may include broadcast signaling and broadcast service data; or the service type of the first data may include RRC signaling and broadcast service data, and the service type of the second data may include broadcast signaling; or the service type of the first data may include RRC signaling and broadcast service data, and the service type of the second data may include RRC signaling and multicast service data.

Optionally, in the embodiments of this application, one first service type may correspond to one bearer type, and one second service type may correspond to one bearer type.

Optionally, in the embodiments of this application, the bearer type includes a first bearer type and a second bearer type, the first bearer type may be a signaling radio bearer (SRB), and the second bearer type may be a data radio bearer (DRB). The resource reserving priority corresponding to the first bearer type may be higher than the resource reserving priority corresponding to the second bearer type.

For example, if a first service type is broadcast signaling or RRC signaling, a bearer type corresponding to the first service type is an SRB; if a first service type is broadcast service data, multicast service data or unicast service data, a bearer type corresponding to the first service type is a DRB.

For example, if a second service type is broadcast signaling or RRC signaling, a bearer type corresponding to the second service type is an SRB; if a second service type is broadcast service data, multicast service data or unicast service data, a bearer type corresponding to the second service type is a DRB.

Optionally, in the embodiments of this application, the first priority may be a resource reserving priority indicated by a first target service type of the at least one first service type. The second priority may be a resource reserving priority indicated by a second target service type of the at least one second service type. The first target service type and the second target service type may correspond to the same bearer type. The first target service type may be a first service type that is of the at least one first service type and that corresponds to a first bearer type and indicates a highest resource reserving priority. The second target service type may be a second service type that is of the at least one second service type and that corresponds to the first bearer type and indicates a highest resource reserving priority.

It should be noted that the first target service type and the second target service type may be the same service type, or may be different service types. This may be specifically determined according to an actual usage requirement, and is not limited in the embodiments of this application.

For example, assuming that the service type of the first data includes RRC signaling and broadcast service data and the service type of the second data includes broadcast signaling and multicast service data, because the RRC signaling and broadcast signaling belong to an SRB (that is, the first bearer type), the first priority may be a resource reserving priority indicated by the RRC signaling, and the second priority may be a resource reserving priority indicated by the broadcast signaling. Because the first priority is lower than the second priority, the UE may determine to use the first resource as the candidate resource.

For example, assuming that the service type of the first data includes broadcast signaling and multicast service data and the service type of the second data includes RRC signaling and multicast service data, because the broadcast signaling and the RRC signaling belong to an SRB (that is, the first bearer type), the first priority may be a resource reserving priority indicated by the broadcast signaling, and the second priority may be a resource reserving priority indicated by the RRC signaling. Because the first priority is higher than the second priority, the UE may determine not to use the first resource as the candidate resource.

For example, assuming that the service type of the first data includes RRC signaling and broadcast service data and the service type of the second data includes RRC signaling and multicast service data, because the RRC signaling belongs to an SRB (that is, the first bearer type), the first priority may be a resource reserving priority indicated by the RRC signaling, and the second priority may be a resource reserving priority indicated by the RRC signaling. Because the first priority is equal to the second priority, the UE may determine to use the first resource as the candidate resource, or determine not to use the first resource as the candidate resource.

In the resource reserving method in the embodiments of this application, according to the resource reserving priority indicated by the service type of the first data and the resource reserving priority indicated by the service type of the second data, it may be determined whether the first resource is used as the candidate resource for transmitting the second data, instead of simply excluding resources of various types of services, which may improve transmission efficiency of a transmission resource.

Optionally, in the embodiments of the present application, when the first information further includes the QoS parameter of the first data and the second information further includes the QoS parameter of the second data, the above step 202E may be specifically implemented in the following first optional implementation (that is, the following step 202E1, step 202E2, or step 202E3); or when the first information further includes the mapping parameter of the first data and the second information further includes the mapping parameter of the second data, the above step 202E may be specifically implemented in the following second optional implementation (that is, the following step 202E1, step 202E4, or step 202E5).

First Optional Implementation

Figure 6:
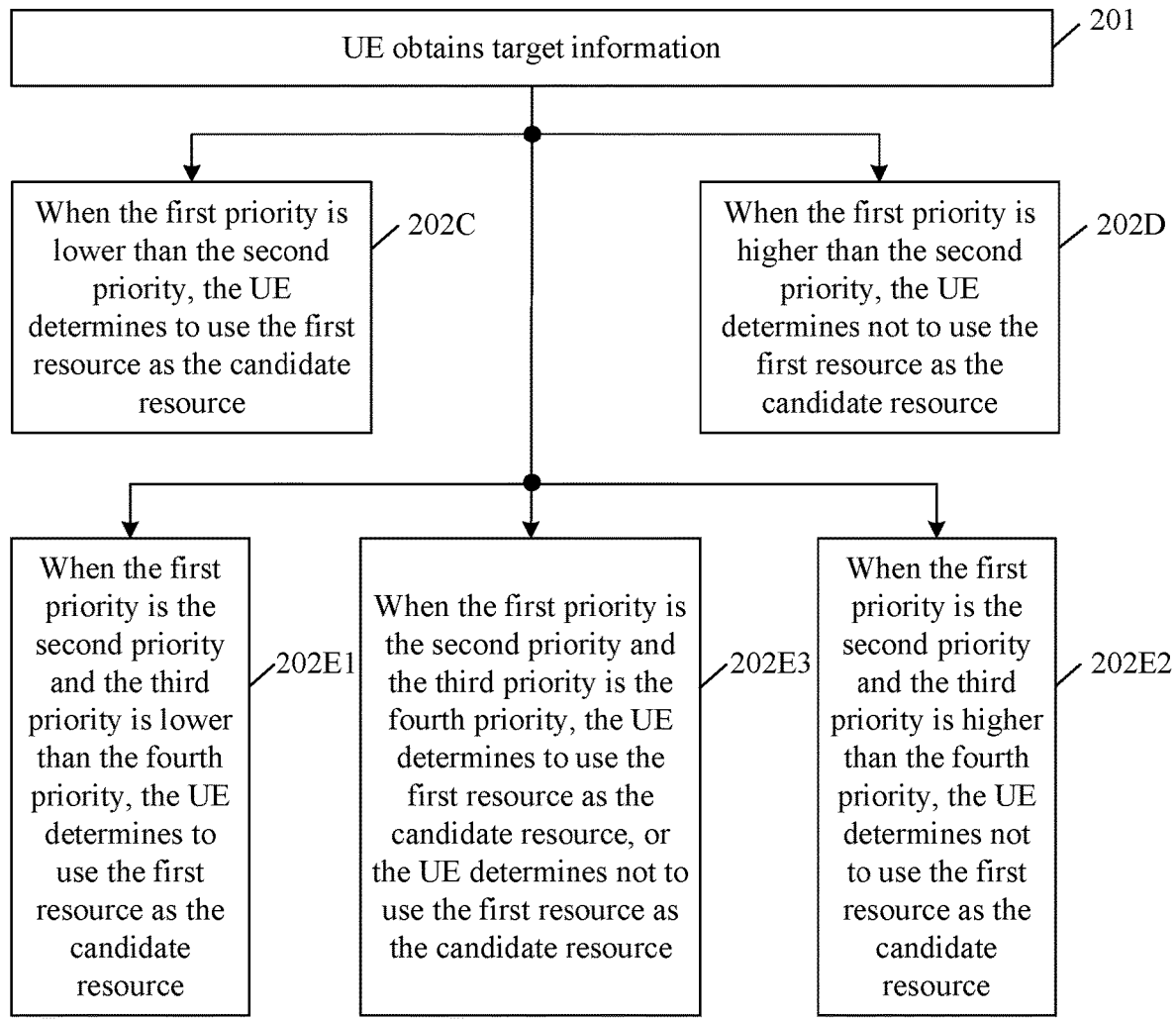
FIG. 6 is a fifth schematic diagram of a resource reserving method according to an embodiment of this application.

With reference to FIG. 5, as shown in FIG. 6, the above step 202E can be implemented in the following step 202E1, step 202E2, or step 202E3.

Step 202E1: When the first priority is equal to the second priority and the third priority is lower than the fourth priority, the UE determines to use the first resource as the candidate resource.

Step 202E2: When the first priority is equal to the second priority and the third priority is higher than the fourth priority, the UE determines not to use the first resource as the candidate resource.

Step 202E3: When the first priority is equal to the second priority and the third priority is equal to the fourth priority, the UE determines to use the first resource as the candidate resource, or the UE determines not to use the first resource as the candidate resource.

The third priority may be a resource reserving priority indicated by the QoS parameter of the first data. The fourth priority may be a resource reserving priority indicated by the QoS parameter of the second data.

For example, in the following illustrative descriptions, the service type of the first data is RRC signaling and the service type of the second data is RRC signaling (that is, the first priority is equal to the second priority), and the QoS parameter of the first data is a PPPP parameter of the first data and the QoS parameter of the second data is a PPPP parameter of the second data.

(1) When the first priority is equal to the second priority, if the value of the PPPP parameter of the first data is higher than the value of the PPPP parameter of the second data, the resource reserving priority (that is, the third priority) indicated by the PPPP parameter of the first data is lower than the resource reserving priority (that is, the fourth priority) indicated by the PPPP parameter of the second data, and the UE may determine to use the first resource as a candidate resource.

(2) When the first priority is equal to the second priority, if the value of the PPPP parameter of the first data is lower than the value of the PPPP parameter of the second data, the resource reserving priority (that is, the third priority) indicated by the PPPP parameter of the first data is higher than the resource reserving priority (that is, the fourth priority) indicated by the PPPP parameter of the second data, and the UE may determine not to use the first resource as a candidate resource.

(3) When the first priority is equal to the second priority, if the value of the PPPP parameter of the first data is equal to the value of the PPPP parameter of the second data, the resource reserving priority (that is, the third priority) indicated by the PPPP parameter of the first data is equal to the resource reserving priority (that is, the fourth priority) indicated by the PPPP parameter of the second data, and the UE may determine to use the first resource as a candidate resource, or may determine not to use the first resource as a candidate resource.

In the resource reserving method in the embodiments of this application, when the first priority is equal to the second priority, according to the resource reserving priority indicated by the QoS parameter of the first data and the resource reserving priority indicated by the QoS parameter of the second data, it may be determined whether the first resource is used as the candidate resource for transmitting the second data, instead of simply excluding resources of various types of services, which may improve transmission efficiency of a transmission resource.

Second Optional Implementation

Figure 7:
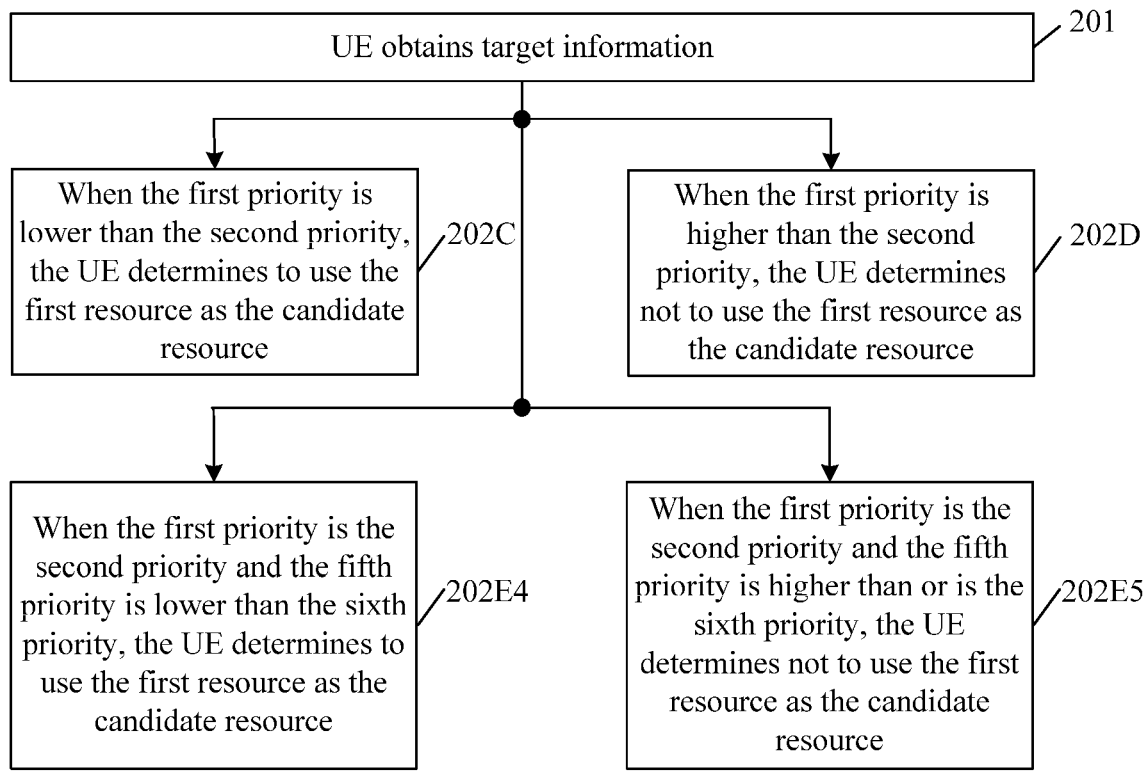
FIG. 7 is a sixth schematic diagram of a resource reserving method according to an embodiment of this application.

With reference to FIG. 5, as shown in FIG. 7, the above step 202E can be implemented in the following step 202E4 or step 202E5.

Step 202E4: When the first priority is equal to the second priority and the fifth priority is lower than the sixth priority, the UE determines to use the first resource as the candidate resource.

Step 202E5: When the first priority is equal to the second priority and the fifth priority is higher than or is equal to the sixth priority, the UE determines not to use the first resource as the candidate resource.

The fifth priority may be a resource reserving priority indicated by the mapping parameter of the first data. The sixth priority may be a resource reserving priority indicated by the mapping parameter of the second data. The fifth priority being lower than the sixth priority may be the signal quality value of the first data being lower than the signal quality threshold. The fifth priority being higher than or being equal to the sixth priority may be the signal quality value of the first data being higher than or being equal to the signal quality threshold.

For example, in the following illustrative descriptions, the service type of the first data is RRC signaling and the service type of the second data is RRC signaling (that is, the first priority is equal to the second priority), and the QoS parameter of the first data is a PPPP parameter of the first data and the QoS parameter of the second data is a PPPP parameter of the second data.

In the embodiments of this application, the UE may perform RSRP measurement based on a resource indicated by control information (such as SA information) or control information, to obtain RSRP of the first data (that is, the mapping parameter of the first data), and map the PPPP parameter of the first data and the PPPP parameter of the second data to an RSRP threshold, to obtain the signal quality threshold (that is, the mapping parameter of the second data). In this way, according to a value relationship between the mapping parameter of the first data and the mapping parameter of the second data, the UE may determine whether to use the first resource as a candidate resource for transmitting the second data.

(1) When the first priority is equal to the second priority, if the RSRP of the first data is less than the signal quality threshold, that is, the resource reserving priority (that is, the fifth priority) indicated by the mapping parameter of the first data is lower than the resource reserving priority (that is, the sixth priority) indicated by the mapping parameter of the second data, the UE may determine to use the first resource as a candidate resource.

(2) When the first priority is equal to the second priority, if the RSRP of the first data is greater than or equal to the signal quality threshold, that is, the resource reserving priority (that is, the fifth priority) indicated by the mapping parameter of the first data is higher than or equal to the resource reserving priority (that is, the sixth priority) indicated by the mapping parameter of the second data, the UE may determine not to use the first resource as a candidate resource.

In the resource reserving method in the embodiments of this application, when the first priority is equal to the second priority, according to the resource reserving priority indicated by the mapping parameter of the first data and the resource reserving priority indicated by the mapping parameter of the second data, it may be determined whether the first resource is used as the candidate resource for transmitting the second data, instead of simply excluding resources of various types of services, which may improve transmission efficiency of a transmission resource.

Figure 8:
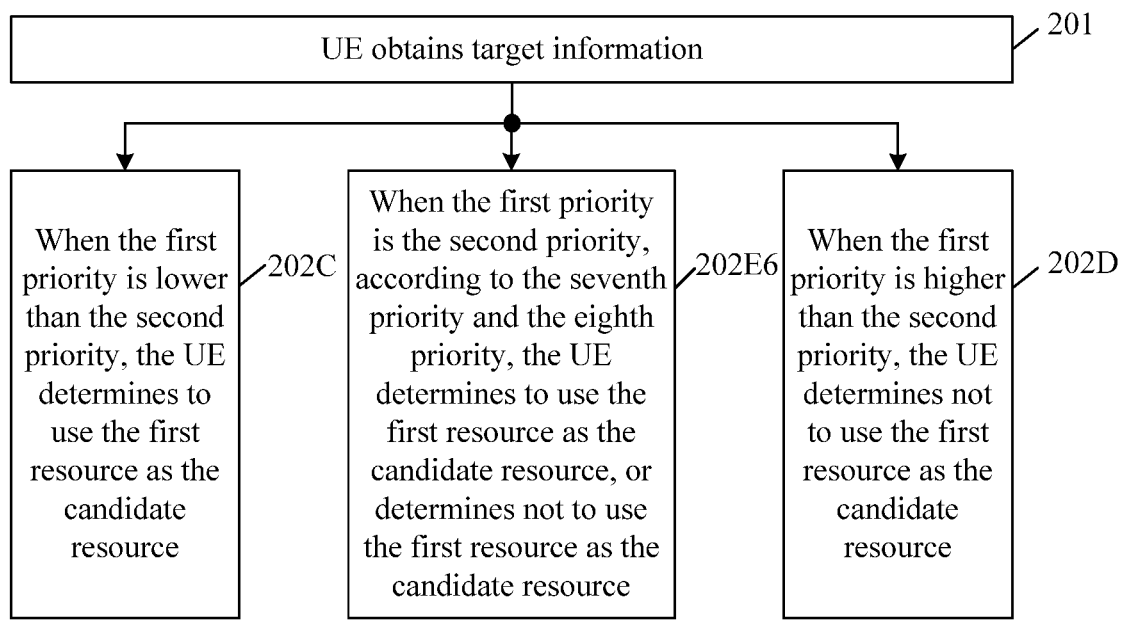
FIG. 8 is a seventh schematic diagram of a resource reserving method according to an embodiment of this application.

Optionally, with reference to FIG. 5, as shown in FIG. 8, when the service type of the first data includes at least one first service type and the service type of the second data includes at least one second service type, the foregoing step 202E may be implemented in the following step 202E6.

Step 202E6: When the first priority is equal to the second priority, according to the seventh priority and the eighth priority, the UE determines to use the first resource as the candidate resource, or determines not to use the first resource as the candidate resource.

The seventh priority may be a resource reserving priority indicated by a third target service type of the at least one first service type. The eighth priority may be a resource reserving priority indicated by a fourth target service type of the at least one second service type. The third target service type and the fourth target service type correspond to the same bearer type. The third target service type is a first service type that is of the at least one first service type and that corresponds to a second bearer type and indicates a highest resource reserving priority. The fourth target service is a second service type that is of the at least one second service type and that corresponds to the second bearer type and indicates a highest resource reserving priority. The resource reserving priority corresponding to the first bearer type is higher than the resource reserving priority corresponding to the second bearer type.

It should be noted that the third target service type and the fourth target service type may be the same service type, or may be different service types. This may be specifically determined according to an actual usage requirement, and is not limited in the embodiments of this application.

For example, assuming that the service type of the first data includes RRC signaling and unicast service data and the service type of the second data includes RRC signaling and multicast service data, because the first priority is equal to the second priority, the UE can compare resource reserving priorities corresponding to the second bearer type. Because unicast service data and multicast service data belong to a DRB (that is, the second bearer type), the seventh priority can be a resource reserving priority indicated by unicast service data, and the eighth priority can be a resource reserving priority indicated by the multicast service data. Because the first priority is equal to the second priority and the seventh priority is lower than the eighth priority, the UE may determine to use the first resource as the candidate resource.

For example, assuming that the service type of the first data includes RRC signaling and broadcast service data and the service type of the second data includes RRC signaling and multicast service data, because the first priority is equal to the second priority, the UE can compare the resource reserving priority corresponding to the second bearer type. Because broadcast service data and multicast service data belong to a DRB (that is, the second bearer type), the seventh priority can be a resource reserving priority indicated by broadcast service data, and the eighth priority can be a resource reserving priority indicated by the multicast service data. Because the first priority is equal to the second priority and the seventh priority is higher than the eighth priority, the UE may determine not to use the first resource as the candidate resource.

For example, assuming that the service type of the first data includes RRC signaling and multicast service data and the service type of the second data includes RRC signaling and multicast service data, because the first priority is equal to the second priority, the UE can compare the resource reserving priority corresponding to the second bearer type. Because multicast service data belongs to a DRB (that is, the second bearer type), the seventh priority can be a resource reserving priority indicated by the multicast service data, and the eighth priority can be a resource reserving priority indicated by the multicast service data. Because the first priority is equal to the second priority and the seventh priority is equal to the eighth priority, the UE can further determine, according to the QoS parameter of the first data and the QoS parameter of the second data (or according to the mapping parameter of the first data and the mapping parameter of the second data), whether to use the first resource as a candidate resource.

In the resource reserving method in the embodiments of this application, when the first priority is equal to the second priority, according to the resource reserving priority indicated by the third target service type and the resource reserving priority indicated by the fourth target service type, it may be determined whether the first resource is used as the candidate resource for transmitting the second data, instead of simply excluding resources of various types of services, which may improve transmission efficiency of a transmission resource.

Figure 9:
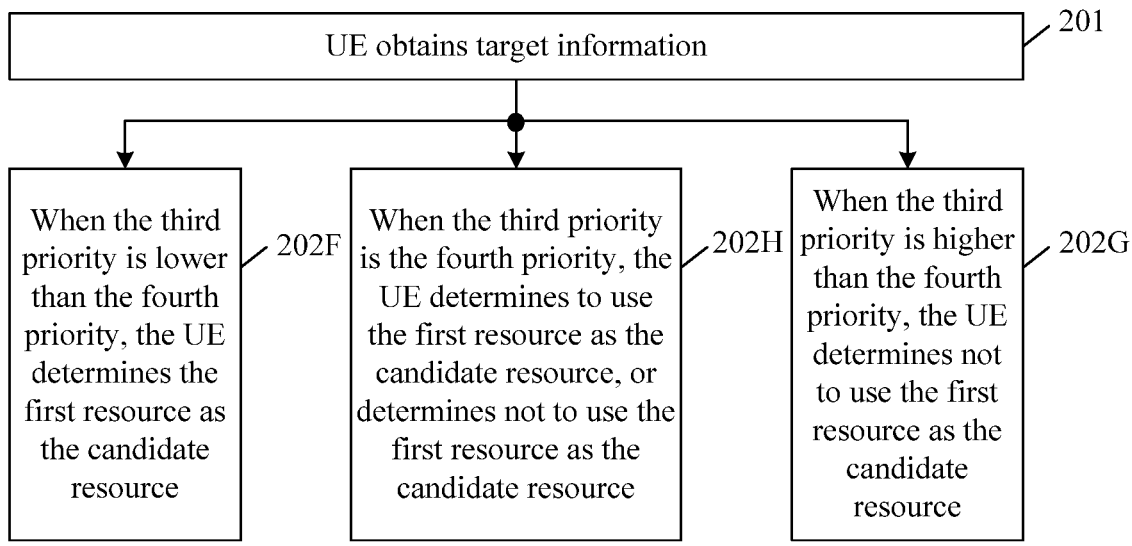
FIG. 9 is an eighth schematic diagram of a resource reserving method according to an embodiment of this application.

Optionally, with reference to FIG. 2, as shown in FIG. 9, when the target information includes the first information and second information, the first information includes the QoS parameter of the first data, and the second information includes the QoS parameter of the second data, the foregoing step 202 may be specifically implemented in the following step 202F, step 202G, or step 202H.

Step 202F: When the third priority is lower than the fourth priority, the UE determines the first resource as the candidate resource.

Step 202G: When the third priority is higher than the fourth priority, the UE determines not to use the first resource as the candidate resource.

Step 202H: When the third priority is equal to the fourth priority, the UE determines to use the first resource as the candidate resource, or determines not to use the first resource as the candidate resource.

The third priority may be a resource reserving priority indicated by the QoS parameter of the first data. The fourth priority may be a resource reserving priority indicated by the QoS parameter of the second data.

For example, in the following illustrative descriptions, the QoS parameter of the first data is a PPPP parameter of the first data, and the QoS parameter of the second data is a PPPP parameter of the second data.

(1) If the value of the PPPP parameter of the first data is higher than the value of the PPPP parameter of the second data, the resource reserving priority (that is, the third priority) indicated by the PPPP parameter of the first data is lower than the resource reserving priority (that is, the fourth priority) indicated by the PPPP parameter of the second data, and the UE may determine to use the first resource as a candidate resource.

Optionally, if the candidate resource set is an empty set and the empty set does not include the first resource, the UE may reserve the first resource in the candidate resource set; if the candidate resource set is a union set and the union set includes the first resource, the UE may not perform a processing action.

(2) If the value of the PPPP parameter of the first data is lower than the value of the PPPP parameter of the second data, the resource reserving priority (that is, the third priority) indicated by the PPPP parameter of the first data is higher than the resource reserving priority (that is, the fourth priority) indicated by the PPPP parameter of the second data, and the UE may determine not to use the first resource as a candidate resource.

Optionally, if the candidate resource set is an empty set and the empty set does not include the first resource, the UE may not perform a processing action; if the candidate resource set is a union set and the union set includes the first resource, the UE may exclude the first resource from the candidate resource set.

(3) If the value of the PPPP parameter of the first data is equal to the value of the PPPP parameter of the second data, the resource reserving priority (that is, the third priority) indicated by the PPPP parameter of the first data is equal to the resource reserving priority (that is, the fourth priority) indicated by the PPPP parameter of the second data, and the UE may determine to use the first resource as a candidate resource, or may determine not to use the first resource as a candidate resource.

In the resource reserving method in the embodiments of this application, according to the resource reserving priority indicated by the QoS parameter of the first data and the resource reserving priority indicated by the QoS parameter of the second data, it may be determined whether the first resource occupied by the first data is used as the candidate resource for transmitting the second data, instead of simply excluding resources of various types of services, which may improve transmission efficiency of a transmission resource.

Figure 10:
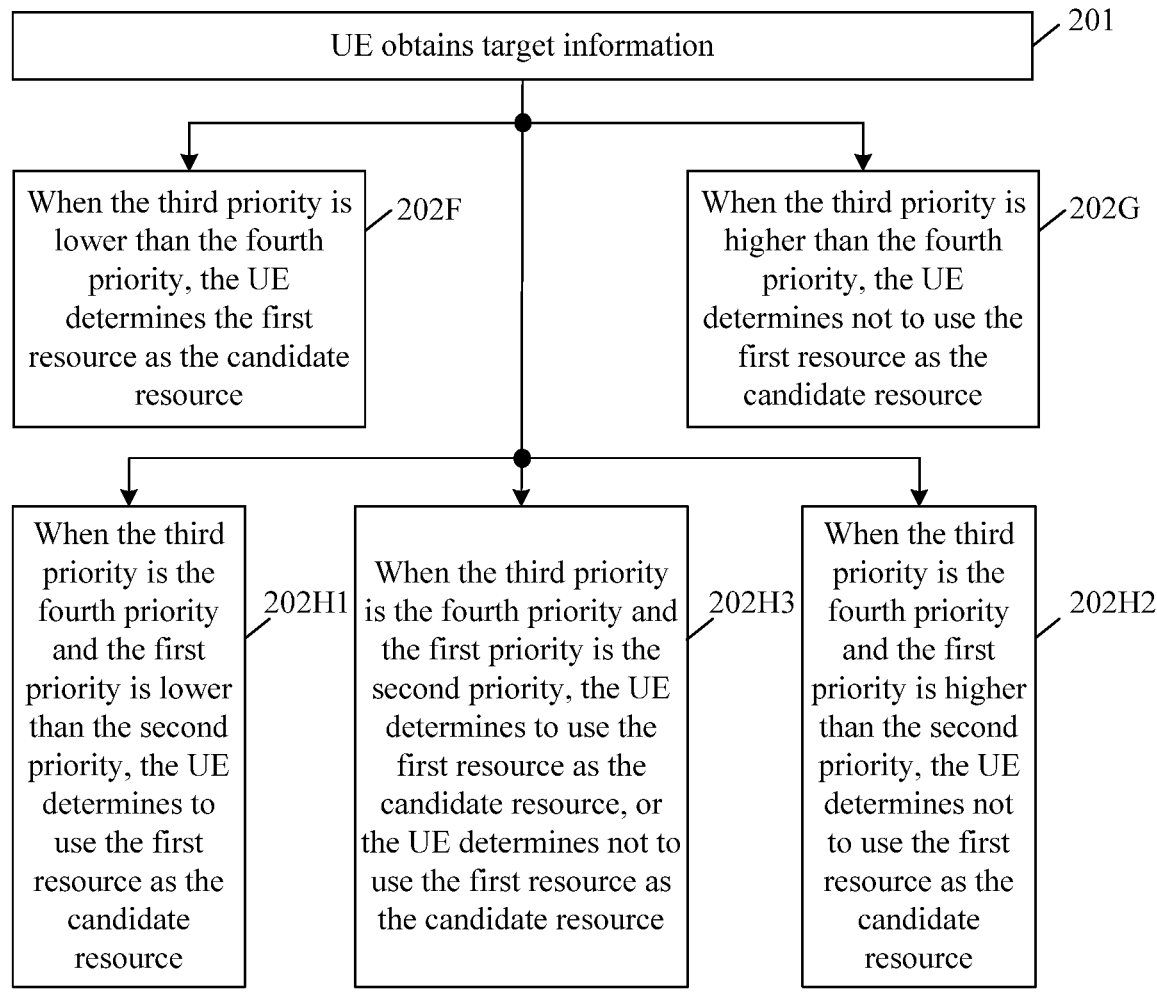
FIG. 10 is a ninth schematic diagram of a resource reserving method according to an embodiment of this application.

Optionally, with reference to FIG. 9, as shown in FIG. 10, when the first information further includes the service type of the first data, and the second information further includes the service type of the second data, the above step 202H can be specifically implemented in the following step 202H1, step 202H2, or step 202H3.

Step 202H1: When the third priority is equal to the fourth priority and the first priority is lower than the second priority, the UE determines to use the first resource as the candidate resource.

Step 202H2: When the third priority is equal to the fourth priority and the first priority is higher than the second priority, the UE determines not to use the first resource as the candidate resource.

Step 202H3: When the third priority is equal to the fourth priority and the first priority is equal to the second priority, the UE determines to use the first resource as the candidate resource, or the UE determines not to use the first resource as the candidate resource.

The first priority may be a resource reserving priority indicated by the service type of the first data. The second priority may be a resource reserving priority indicated by the service type of the second data.

For example, in the following illustrative descriptions, the third priority is equal to the fourth priority, and the service type of the second data is RRC signaling.

(1) When the third priority is equal to the fourth priority, if the service type of the first data is broadcast service data, multicast service data or unicast service data, because the resource reserving priority (that is, the first priority) indicated by the service type of the first data is lower than a resource reserving priority (that is, the second priority) indicated by the service type of the second data, the UE may determine to use the first resource as the candidate resource.

(2) When the third priority is equal to the fourth priority, if the service type of the first data is broadcast signaling, because the resource reserving priority (that is, the first priority) indicated by the service type of the first data is higher than the resource reserving priority (that is, the second priority) indicated by the service type of the second data, the UE may determine not to use the first resource as the candidate resource.

(3) When the third priority is equal to the fourth priority, if the service type of the first data is RRC signaling, because the resource reserving priority (that is, the first priority) indicated by the service type of the first data is equal to the resource reserving priority (that is, the second priority) indicated by the service type of the second data, the UE may determine to use the first resource as the candidate resource, or determine not to use the first resource as the candidate resource.

In the resource reserving method in the embodiments of this application, when the third priority is equal to the fourth priority, according to the resource reserving priority indicated by the service type of the first data and the resource reserving priority indicated by the service type of the second data, it may be determined whether the first resource is used as the candidate resource for transmitting the second data, instead of simply excluding resources of various types of services, which may improve transmission efficiency of a transmission resource.

Figure 11:
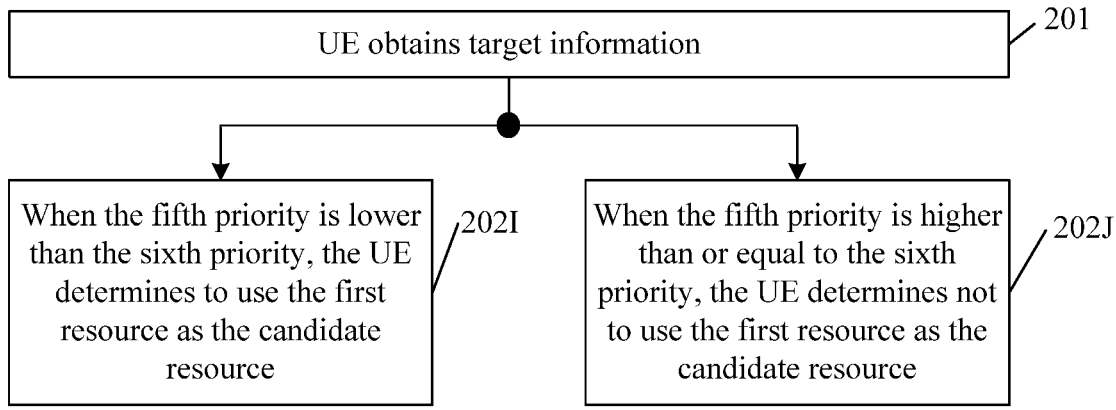
FIG. 11 is a tenth schematic diagram of a resource reserving method according to an embodiment of this application.

Optionally, with reference to FIG. 2, as shown in FIG. 11, when the target information includes the first information and the second information, the first information includes the mapping parameter of the first data, and the second information includes the mapping parameter of the second data, the above step 202 may be specifically implemented in the following step 202I or step 202J.

Step 202I: When the fifth priority is lower than the sixth priority, the UE determines to use the first resource as the candidate resource.

Step 202J: When the fifth priority is higher than or equal to the sixth priority, the UE determines not to use the first resource as the candidate resource.

The fifth priority may be a resource reserving priority indicated by the mapping parameter of the first data, and the sixth priority may be a resource reserving priority indicated by the mapping parameter of the second data. The fifth priority being lower than the sixth priority may be the signal quality value of the first data being lower than the signal quality threshold. The fifth priority being higher than or being equal to the sixth priority may be the signal quality value of the first data being higher than or equal to the signal quality threshold.

For example, in the following illustrative descriptions, the QoS parameter of the first data is a PPPP parameter of the first data, and the QoS parameter of the second data is a PPPP parameter of the second data.

In the embodiments of this application, the UE may perform RSRP measurement based on a resource indicated by control information (such as SA information) or control information, to obtain RSRP of the first data (that is, the mapping parameter of the first data), and map the PPPP parameter of the first data and the PPPP parameter of the second data to an RSRP threshold, to obtain the signal quality threshold (that is, the mapping parameter of the second data).

(1) If the RSRP of the first data is less than the signal quality threshold, that is, the resource reserving priority (that is, the fifth priority) indicated by the mapping parameter of the first data is lower than the resource reserving priority (that is, the sixth priority) indicated by the mapping parameter of the second data, the UE may determine to use the first resource as a candidate resource.

(2) If the RSRP of the first data is greater than or equal to the signal quality threshold, that is, the resource reserving priority (that is, the fifth priority) indicated by the mapping parameter of the first data is higher than or equal to the resource reserving priority (that is, the sixth priority) indicated by the mapping parameter of the second data, the UE may determine not to use the first resource as a candidate resource.

In the resource reserving method in the embodiments of this application, according to the resource reserving priority indicated by the mapping parameter of the first data and the resource reserving priority indicated by the mapping parameter of the second data, it may be determined whether the first resource is used as the candidate resource for transmitting the second data, instead of simply excluding resources of various types of services, which may improve transmission efficiency of a transmission resource.

Figure 12:
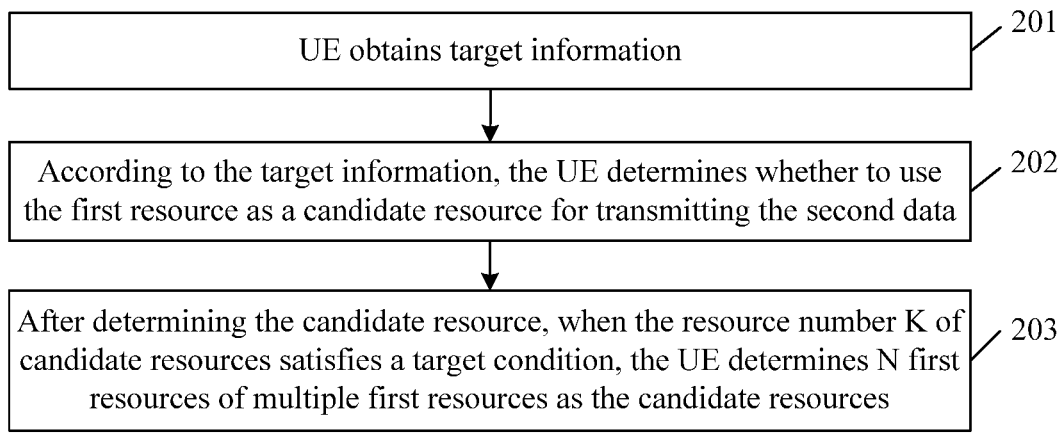
FIG. 12 is an eleventh schematic diagram of a resource reserving method according to an embodiment of this application.

Optionally, with reference to FIG. 2, as shown in FIG. 12, the resource reserving method provided in the embodiments of this application may further include the following step 203.

Step 203: After determining the candidate resource, when the resource number K of candidate resources satisfies a target condition, the UE determines N first resources of multiple first resources as the candidate resources.

The N first resources are resources occupied by N pieces of data that have a lowest service type priority and the least interference.

In the embodiments of this application, the target condition may be that the resource number of the candidate resources is less than a number threshold, where N=the number threshold-K; or the target condition may be that a first ratio of the resource number of the candidate resources to a total number of resources is less than a ratio threshold, where N=total number of resources*(ratio threshold-K/total number of resources), and K and N are both positive integers.

Optionally, in the embodiments of the present application, the total resources may be all resources in a union set after initialization; or may be all resources occupied by multiple first resources.

For example, the number threshold may be 10, 50, or the like. The ratio threshold can be 10%, 20%, or the like.

For example, in illustrative descriptions, the number threshold is 10. After determining the candidate resource, if the resource number of the candidate resource is 4, the UE can sort the multiple first resources according to priorities of the service types of the multiple first resources, and sort at least one resource of the same service type according to interference degrees. If there are X (X>6) pieces of data with the lowest service type priority, the UE can select 6 pieces of data from the X pieces of data, and determine 6 second resources occupied by the 6 pieces of data as candidate resources.

In the resource reservation method provided in the embodiments of the present application, when the resource number of the candidate resources is less than the resource threshold, the candidate resources can be re-determined, so that sufficient resources can be reserved for the to-be-transmitted data, thereby ensuring normal transmission of the to-be-transmitted data.

Figure 13:
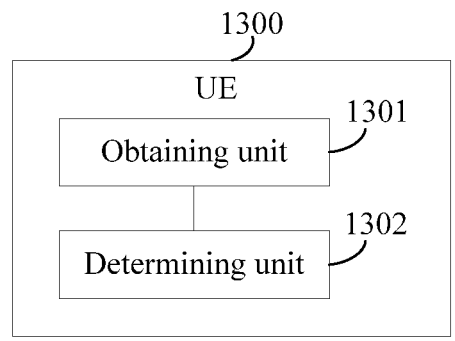
FIG. 13 is a schematic structural diagram of UE according to an embodiment of this application.

FIG. 13 is a possible schematic structural diagram of UE according to an embodiment of this application. As shown in FIG. 13, the UE 1300 provided in an embodiment of the present application may include: an obtaining unit 1301 and a determining unit 1302. The obtaining unit 1301 may be configured to obtain target information, where the target information may include at least one of first information and second information, the first information may be used to indicate a resource reserving priority of first data, the second information may be used to indicate a resource reserving priority of second data, the first data may be data that occupies a first resource, and the second data may be to-be-transmitted data. The determining unit 1302 may be configured to: according to the target information obtained by the obtaining unit 1301, determine whether to use the first resource as a candidate resource for transmitting the second data.

Optionally, in the embodiments of this application, the first information may include at least one of the following: a service type of the first data, a QoS parameter of the first data, and a mapping parameter of the first data. The second information may include at least one of the following: a service type of the second data, a QoS parameter of the second data, and a mapping parameter of the second data. The mapping parameter of the first data may be a signal quality value of the first data, and the mapping parameter of the second data may be a signal quality threshold obtained by mapping the QoS parameter of the first data and the QoS parameter of the second data.

Optionally, in the embodiments of this application, the target information includes the first information and the second information, the first information includes a service type of the first data, and the second information includes a service type of the second data. The determining unit 1302 may be specifically configured to: when the first priority is lower than the second priority, determine the first resource as the candidate resource; when the first priority is higher than the second priority, determine not to use the first resource as the candidate resource; and when the first priority is equal to the second priority, determine to use the first resource as the candidate resource, or determine not to use the first resource as the candidate resource. The first priority is a resource reserving priority indicated by the service type of the first data, and the second priority is a resource reserving priority indicated by the service type of the second data.

Optionally, in this embodiment of the present application, the first information may also include the QoS parameter of the first data, and the second information may also include the QoS parameter of the second data. The determining unit 1302 may be specifically configured to: when the first priority is equal to the second priority and the third priority is lower than the fourth priority, determine to use the first resource as the candidate resource; when the first priority is equal to the second priority and the third priority is higher than the fourth priority, determine not to use the first resource as the candidate resource; and when the first priority is equal to the second priority and the third priority is equal to the fourth priority, determine to use the first resource as the candidate resource, or determine not to use the first resource as the candidate resource. The third priority is a resource reserving priority indicated by the QoS parameter of the first data, and the fourth priority is a resource reserving priority indicated by the QoS parameter of the second data.

Optionally, in this embodiment of the present application, the first information may further include the mapping parameter of the first data, and the second information may also include the mapping parameter of the second data. The determining unit 1302 may be specifically configured to: when the first priority is equal to the second priority and the fifth priority is lower than the sixth priority, determine to use the first resource as the candidate resource; and when the first priority is equal to the second priority and the fifth priority is higher than or is equal to the sixth priority, determine not to use the first resource as the candidate resource; where the fifth priority is the resource reserving priority indicated by the mapping parameter of the first data, and the sixth priority is the resource reserving priority indicated by the mapping parameter of the second data; the fifth priority being lower than the sixth priority is the signal quality value of the first data being lower than the signal quality threshold; and the fifth priority being higher than or being equal to the sixth priority is the signal quality value of the first data being higher than or being equal to the signal quality threshold.

Optionally, in the embodiments of this application, the service type of the first data may include at least one first service type, and the service type of the second data may include at least one second service type. One first service type may correspond to one bearer type, and one second service type may correspond to one bearer type. The first priority may be a resource reserving priority indicated by the first target service type of the at least one first service type, the second priority may be the second target service type of the at least one second service type, and the first target service type and the second target service type correspond to the same bearer type. The first target service type is a first service type that is of the at least one first service type and that corresponds to a first bearer type and indicates a highest resource reserving priority; the second target service type is a second service type that is of the at least one second service type and that corresponds to the first bearer type and indicates a highest resource reserving priority; and a resource reserving priority corresponding to the first bearer type is a preset highest resource reserving priority.

Optionally, in this embodiment of this application, the determining unit 1302 may be specifically configured to: when the first priority is equal to the second priority, according to the seventh priority and the eighth priority, determine to use the first resource as the candidate resource, or determine not to use the first resource as the candidate resource. The seventh priority is a resource reserving priority indicated by a third target service type of the at least one first service type, the eighth priority is a resource reserving priority indicated by a fourth target service type of the at least one second service type, and the third target service type and the fourth target service type correspond to the same bearer type. The third target service type is a first service type that is of the at least one first service type and that corresponds to a second bearer type and indicates a highest resource reserving priority. The fourth target service is a second service type that is of the at least one second service type and that corresponds to the second bearer type and indicates a highest resource reserving priority. The resource reserving priority corresponding to the second bearer type is lower than the resource reserving priority corresponding to the first bearer type.

Optionally, in this embodiment of the present application, the target information includes the first information and the second information, the first information includes a QoS parameter of the first data, and the second information includes a QoS parameter of the second data. The determining unit 1302 may be specifically configured to: when the third priority is lower than the fourth priority, determine the first resource as the candidate resource; when the third priority is higher than the fourth priority, determine not to use the first resource as the candidate resource; and when the third priority is equal to the fourth priority, determine to use the first resource as the candidate resource, or determine not to use the first resource as the candidate resource. The third priority is a resource reserving priority indicated by the QoS parameter of the first data, and the fourth priority is a resource reserving priority indicated by the QoS parameter of the second data.

Optionally, in this embodiment of the present application, the first information may also include a service type of the first data, and the second information may also include a service type of the second data. The determining unit 1302 may be specifically configured to: when the third priority is equal to the fourth priority and the first priority is lower than the second priority, determine to use the first resource as the candidate resource; when the third priority is equal to the fourth priority and the first priority is higher than the second priority, determine not to use the first resource as the candidate resource; and when the third priority is equal to the fourth priority and the first priority is equal to the second priority, determine to use the first resource as the candidate resource, or determine not to use the first resource as the candidate resource. The first priority is a resource reserving priority indicated by the service type of the first data, and the second priority is a resource reserving priority indicated by the service type of the second data.

Optionally, in this embodiment of the present application, the target information includes the first information and the second information, the first information includes a mapping parameter of the first data, and the second information includes a mapping parameter of the second data. The determining unit 1302 may be specifically configured to: when the fifth priority is lower than the sixth priority, determine to use the first resource as the candidate resource; and when the fifth priority is higher than or is equal to the sixth priority, determine not to use the first resource as the candidate resource; where the fifth priority is the resource reserving priority indicated by the mapping parameter of the first data, and the sixth priority is the resource reserving priority indicated by the mapping parameter of the second data; the fifth priority being lower than the sixth priority is the signal quality value of the first data being lower than the signal quality threshold; and the fifth priority being higher than or being equal to the sixth priority is the signal quality value of the first data being higher than or being equal to the signal quality threshold.

Optionally, in the embodiments of this application, the target information includes the first information. The determining unit 1302 may be specifically configured to: when the first information is first preset information, determine to use the first resource as the candidate resource, where a resource reserving priority indicated by the first preset information is a lowest priority.

Optionally, in the embodiments of this application, the target information includes second information. The determining unit 1302 may be specifically configured to: when the second information is second preset information, determine to use the first resource as the candidate resource, where a resource reserving priority indicated by the second preset information is a highest priority.

Optionally, in this embodiment of the present application, the determining unit 1302 may be further configured to: after determining the candidate resource, when the resource number K of candidate resources satisfies a target condition, determine N first resources of multiple first resources as the candidate resources again, where the N first resources are resources occupied by N pieces of data that have a lowest service type priority and the least interference. The target condition may be that the resource number of the candidate resources is less than a number threshold, where N=the number threshold-K; or the target condition may be that a first ratio of the resource number of the candidate resources to a total number of resources is less than a ratio threshold, where N=total number of resources*(ratio threshold-K/total number of resources), and K and N are both positive integers.

Optionally, in the embodiments of this application, a service type is any one of the following: broadcast signaling, radio resource control signaling, broadcast service data, multicast service data, and unicast service data.

Optionally, in the embodiments of this application, a resource reserving priority of data may be predefined in a communication protocol, or preconfigured by UE or configured by UE, or preconfigured by a network device or configured by a network device.

Optionally, in this embodiment of the present application, the service type of the first data may be indicated by radio resource control signaling, sidelink control information, or downlink control information.

The UE provided in an embodiment of the present application can implement the processes implemented by the UE in the foregoing method embodiments. To avoid repetition, details are not described herein again.

The embodiments of this application provide the UE. The UE may determine the resource reserving priority of the first data and/or the second data according to the target information, and determine whether the first resource reserved for the first data is used as the candidate resource for transmitting the second data. Therefore, when service types of the first data and the second data are the same or different, the UE in the embodiments of this application may use the first resource as the candidate resource for transmitting the second data, instead of simply excluding resources of various types of services, which may improve transmission efficiency of a transmission resource.

Figure 14:
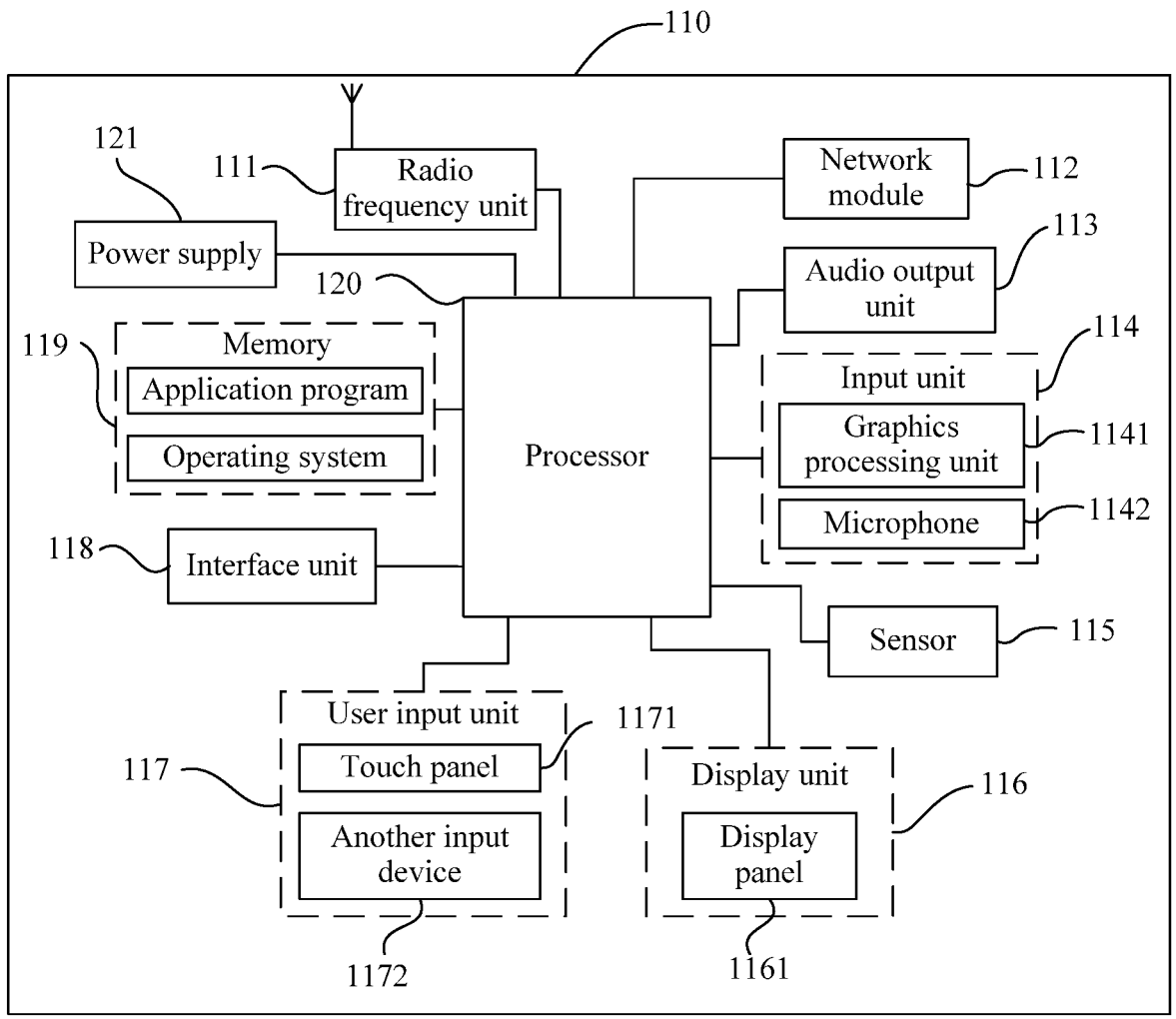
FIG. 14 is a schematic diagram of hardware of UE according to an embodiment of this application.

FIG. 14 is a schematic diagram of hardware of UE according to an embodiment of the present application. As shown in FIG. 14, the UE 110 includes but is not limited to: a radio frequency unit 111, a network module 112, an audio output unit 113, an input unit 114, a sensor 115, a display unit 116, a user input unit 117, an interface unit 118, a memory 119, a processor 120, a power supply 121, and other components. It should be noted that a person skilled in the art may understand that the structure of the UE shown in FIG. 14 does not constitute a limitation to the UE. The UE may include more or fewer components than those shown in FIG. 14, or a combination of some components, or an arrangement of different components. For example, in this embodiment of the present application, the UE includes but is not limited to a mobile phone, a tablet computer, a notebook computer, a palmtop computer, a vehicle-mounted terminal, a wearable device, and a pedometer.

The processor 120 may be configured to obtain target information, where the target information may include at least one of first information and second information, the first information may be used to indicate a resource reserving priority of first data, the second information may be used to indicate a resource reserving priority of second data, the first data is data that occupies a first resource, and the second data is to-be-transmitted data; and according to the target information, it is determined whether to use the first resource as a candidate resource for transmitting the second data.

The embodiments of this application provide the UE. The UE may determine the resource reserving priority of the first data and/or the second data according to the target information, and determine whether the first resource reserved for the first data is used as the candidate resource for transmitting the second data. Therefore, when service types of the first data and the second data are the same or different, the UE in the embodiments of this application may use the first resource as the candidate resource for transmitting the second data, instead of simply excluding resources of various types of services, which may improve transmission efficiency of a transmission resource.

It should be understood that, in this embodiment of this application, the radio frequency unit 111 may be configured to receive and transmit information, or receive and transmit signals during a call. Specifically, the radio frequency unit 111 receives downlink data from a base station, and transmits the downlink data to the processor 120 for processing; and in addition, transmits uplink data to the base station. Generally, the radio frequency unit 111 includes, but is not limited to, an antenna, at least one amplifier, a transceiver, a coupler, a low noise amplifier, a duplexer, and the like. In addition, the radio frequency unit 111 may also communicate with another device through a wireless communications system and network.

The UE provides a user with wireless broadband Internet access by using the network module 112, for example, helps the user send and receive emails, browse web pages, and access streaming media.

The audio output unit 113 may convert audio data received by the radio frequency unit 111 or the network module 112 or stored in the memory 119 into an audio signal, and output the audio signal into sound. In addition, the audio output unit 113 may also provide audio output related to a specific function performed by the UE 110 (for example, call signal receiving sound or message receiving sound). The audio output unit 113 includes a speaker, a buzzer, a receiver, and the like.

The input unit 114 is configured to receive audio or video signals. The input unit 114 may include a graphics processing unit (GPU) 1141 and a microphone 1142. The graphics processing unit 1141 processes image data of a static image or a video obtained by an image capturing apparatus (such as, a camera) in a video capturing mode or an image capturing mode. A processed image frame may be displayed on the display unit 116. An image frame processed by the graphics processing unit 1141 may be stored in the memory 119 (or another storage medium) or sent by the radio frequency unit 111 or the network module 112. The microphone 1142 may receive a sound and can process such sound into audio data. Processed audio data may be converted, in telephone call mode, into a format that can be sent to a mobile communication base station via the radio frequency unit 111 for output.

The UE 110 further includes at least one sensor 115, for example, a light sensor, a motion sensor, and other sensors. Specifically, the light sensor includes an ambient light sensor and a proximity sensor, where the ambient light sensor may adjust brightness of a display panel 1161 based on brightness of ambient light, and the proximity sensor may turn off the display panel 1161 and/or backlight when the UE 110 is moved towards the ear. As a motion sensor, an accelerometer sensor may detect magnitude of acceleration in various directions (usually three axes), may detect magnitude and the direction of gravity when stationary, may be configured to identify UE postures (such as horizontal and vertical screen switch, related games, and magnetometer posture calibration), may perform functions related to vibration identification (such as a pedometer and a knock), and the like. The sensor 115 may further include a fingerprint sensor, a pressure sensor, an iris sensor, a molecular sensor, a gyroscope, a barometer, a hygrometer, a thermometer, an infrared sensor, or the like. Details are not described herein.

The display unit 116 is configured to display information input by the user or information provided to the user. The display unit 116 may include a display panel 1161, and the display panel 1161 may be configured in a form of liquid crystal display (LCD), organic light-emitting diode (OLED), or the like.

The user input unit 117 may be configured to receive input numeric or character information, and generate key signal inputs related to user settings and function control of the UE. Specifically, the user input unit 117 includes a touch panel 1171 and another input device 1172. The touch panel 1171, also called a touch screen, may collect a touch operation of the user on or near the touch panel 1171 (For example, the user uses any suitable object or accessory such as a finger or a stylus to operate on or near the touch panel 1171). The touch panel 1171 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 120, receives a command sent by the processor 120, and executes the command. In addition, the touch panel 1171 may be implemented by using a plurality of types such as a resistive type, a capacitive type, an infrared ray, and a surface acoustic wave. In addition to the touch panel 1171, the user input unit 117 may further include the another input device 1172. Specifically, the another input device 1172 may include, but is not limited to, a physical keyboard, a function key (such as a volume control key or an on/off key), a trackball, a mouse, and a joystick. Details are not described herein again.

Further, the touch panel 1171 may cover the display panel 1161. When detecting a touch operation on or near the touch panel 1171, the touch panel 1171 transmits the touch operation to the processor 120 to determine a type of a touch event. Then, the processor 120 provides corresponding visual output on the display panel 1161 based on the type of the touch event. Although in FIG. 14, the touch panel 1171 and the display panel 1161 are used as two independent components to implement input and output functions of the UE, in some embodiments, the touch panel 1171 and the display panel 1161 may be integrated to implement the input and output functions of the UE. This is not specifically limited herein.

The interface unit 118 is an interface for connecting an external apparatus to the UE 110. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 118 may be configured to receive input (for example, data information and power) from the external apparatus and transmit the received input to one or more elements in the UE 110, or may be configured to transmit data between the UE 110 and the external apparatus.

The memory 119 may be configured to store a software program and various data. The memory 119 may mainly include a program storage area and a data storage area. The program storage area may store an operating system, an application program required by at least one function (such as a sound playback function and an image playback function), and the like. The data storage area may store data (such as audio data and an address book) created based on the use of the mobile phone, and the like. In addition, the memory 119 may include a high-speed random access memory, and may further include a non-volatile memory such as at least one magnetic disk storage component, a flash memory component, or another volatile solid-state storage component.

The processor 120 is a control center of the UE, connects various parts of the entire UE by using various interfaces and circuits, and performs various functions of the UE and processes data by running or executing software programs and/or modules stored in the memory 119 and invoking data stored in the memory 119, so as to monitor the UE as a whole. The processor 120 may include one or more processing units. Optionally, the processor 120 may integrate an application processor and a modem processor. This application processor mainly deals with an operating system, a user interface, an application, and the like. The modem processor mainly deals with wireless communication. It may be understood that, alternatively, the modem processor may not be integrated into the processor 120.

The UE 110 may further include the power supply 121 (for example, a battery) configured to supply power to various components. Optionally, the power supply 121 may be logically connected to the processor 120 through a power management system, so as to implement functions such as managing charging, discharging, and power consumption through the power management system.

In addition, the UE 110 includes some function modules not shown. Details are not described herein.

Optionally, an embodiment of this application further provides UE, including the processor 120 and the memory 119 that are shown in FIG. 14, and a computer program stored in the memory 119 and executable on the processor 120, where the computer program, when executed by the processor 120, implements the processes of the foregoing method embodiments, and the same technical effects can be achieved. To avoid repetition, details are not described herein again.

An embodiment of this application further provides a non-transitory computer-readable storage medium. The non-transitory computer-readable storage medium stores a computer program, and the computer program, when executed by a processor, implements the foregoing processes of the foregoing method embodiments and a same technical effect can be achieved. To avoid repetition, details are not described herein again. The non-transitory computer-readable storage medium is, for example, a read-only memory (ROM), a random access memory (RAM), a magnetic disk, or an optical disc.

It should be noted that in this specification, the term "include", "comprise", or any other variant thereof is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of this application essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementations. The foregoing specific implementations are merely schematic instead of restrictive. Under enlightenment of this application, a person of ordinary skills in the art may make many forms without departing from aims of this application and the protection scope of claims, all of which fall within the protection of this application.

What is claimed is:

1. A resource reserving method, wherein the method comprises:
    obtaining, by a user equipment (UE), target information, wherein the target information comprises at least one of first information or second information, the first information is used to indicate a resource reserving priority of first data, the second information is used to indicate a resource reserving priority of second data, the first data is data that occupies a first resource, and the second data is to-be-transmitted data; and
    according to the target information, determining whether to use the first resource as a candidate resource for transmitting the second data,
    wherein the first information comprises at least one of the following: a service type of the first data, a quality of service (QoS) parameter of the first data, or a mapping parameter of the first data; the second information comprises at least one of the following: a service type of the second data, a QoS-parameter of the second data, or a mapping parameter of the second data,
    wherein the mapping parameter of the first data is a signal quality value of the first data, and the mapping parameter of the second data is a signal quality threshold obtained by mapping the QoS parameter of the first data and the QS parameter of the second data,
    wherein the service type is any one of the following: broadcast signaling, radio resource control signaling, broadcast service data, multicast service data, and unicast service data.

2. The method according to claim 1, wherein the target information comprises the first information and the second information, the first information comprises the service type of the first data, and the second information comprises the service type of the second data; and
    the according to the target information, determining whether to use the first resource as the candidate resource for transmitting the second data comprises:
    when the a first priority is lower than a second priority, determining to use the first resource as the candidate resource;
    when the first priority is higher than the second priority, determining not to use the first resource as the candidate resource; and
    when the first priority is equal to the second priority, determining to use the first resource as the candidate resource, or determining not to use the first resource as the candidate resource; wherein
    the first priority is a resource reserving priority indicated by the service type of the first data, and the second priority is a resource reserving priority indicated by the service type of the second data.

3. The method according to claim 2, wherein the first information further comprises the QoS parameter of the first data, and the second information further comprises the QoS parameter of the second data; and
    the when the first priority is equal to the second priority, determining to use the first resource as the candidate resource, or determining not to use the first resource as the candidate resource comprises:
    when the first priority is equal to the second priority and a third priority is lower than a fourth priority, determining to use the first resource as the candidate resource;
    when the first priority is equal to the second priority and the third priority is higher than the fourth priority, determining not to use the first resource as the candidate resource; and
    when the first priority is equal to the second priority and the third priority is equal to the fourth priority, determining to use the first resource as the candidate resource, or determining not to use the first resource as the candidate resource; wherein the third priority is a resource reserving priority indicated by the QoS parameter of the first data, and the fourth priority is a resource reserving priority indicated by the QoS parameter of the second data.

4. The method according to claim 2, wherein the first information further comprises the mapping parameter of the first data, and the second information further comprises the mapping parameter of the second data;
the when the first priority is equal to the second priority, determining to use the first resource as the candidate resource, or determining not to use the first resource as the candidate resource comprises:
when the first priority is equal to the second priority and a fifth priority is lower than a sixth priority, determining to use the first resource as the candidate resource; and
when the first priority is equal to the second priority and the fifth priority is higher than or is equal to the sixth priority, determining not to use the first resource as the candidate resource; wherein
the fifth priority is the resource reserving priority indicated by the mapping parameter of the first data, and the sixth priority is the resource reserving priority indicated by the mapping parameter of the second data; the fifth priority being lower than the sixth priority is the signal quality value of the first data being lower than the signal quality threshold; and the fifth priority being higher than or being equal to the sixth priority is the signal quality value of the first data being higher than or being equal to the signal quality threshold.

5. The method according to claim 2, wherein the service type of the first data comprises at least one first service type, the service type of the second data comprises at least one second service type, the first service type corresponds to a bearer type, and second service type corresponds to a bearer type; and
the first priority is a resource reserving priority indicated by a first target service type of the at least one first service type, and the second priority is a resource reserving priority indicated by a second target service type of the at least one second service type; the first target service type is a first service type that is of the at least one first service type and that corresponds to a first bearer type and indicates a highest resource reserving priority; the second target service type is a second service type that is of the at least one second service type and that corresponds to the first bearer type and indicates a highest resource reserving priority; and a resource reserving priority corresponding to the first bearer type is a preset highest resource reserving priority.

6. The method according to claim 5, wherein the when the first priority is equal to the second priority, determining to use the first resource as the candidate resource, or determining not to use the first resource as the candidate resource comprises:
when the first priority is equal to the second priority, according to a seventh priority and an eighth priority, determining to use the first resource as the candidate resource, or determining not to use the first resource as the candidate resource; wherein
the seventh priority is a resource reserving priority indicated by a third target service type of the at least one first service type, and the eighth priority is a resource reserving priority indicated by a fourth target service type of the at least one second service type; the third target service type is a first service type that is of the at least one first service type and that corresponds to a second bearer type and indicates a highest resource reserving priority; the fourth target service is a second service type that is of the at least one second service type and that corresponds to the second bearer type and indicates a highest resource reserving priority; and a resource reserving priority corresponding to the second bearer type is lower than a resource reserving priority corresponding to the first bearer type.

7. The method according to claim 1, wherein the target information comprises the first information and the second information, the first information comprises the QoS parameter of the first data, and the second information comprises the QoS parameter of the second data; and
the according to the target information, determining whether to use the first resource as the candidate resource for transmitting the second data comprises:
when a third priority is lower than a fourth priority, determining to use the first resource as the candidate resource;
when the third priority is higher than the fourth priority, determining not to use the first resource as the candidate resource; and
when the third priority is equal to the fourth priority, determining to use the first resource as the candidate resource, or determining not to use the first resource as the candidate resource; wherein
the third priority is a resource reserving priority indicated by the QoS parameter of the first data, and the fourth priority is a resource reserving priority indicated by the QoS parameter of the second data.

8. The method according to claim 7, wherein the first information further comprises the service type of the first data, and the second information further comprises the service type of the second data;
the when the third priority is equal to the fourth priority, determining to use the first resource as the candidate resource, or determining not to use the first resource as the candidate resource comprises:
when the third priority is equal to the fourth priority and the first priority is lower than the second priority, determining to use the first resource as the candidate resource;
when the third priority is equal to the fourth priority and the first priority is higher than the second priority, determining not to use the first resource as the candidate resource; and
when the third priority is equal to the fourth priority and the first priority is equal to the second priority, determining to use the first resource as the candidate resource, or determining not to use the first resource as the candidate resource; wherein
the first priority is a resource reserving priority indicated by the service type of the first data, and the second priority is a resource reserving priority indicated by the service type of the second data.

9. The method according to claim 1, wherein the target information comprises the first information and the second information, the first information comprises the mapping parameter of the first data, and the second information comprises the mapping parameter of the second data; and
the according to the target information, determining whether to use the first resource as the candidate resource for transmitting the second data comprises:
when a fifth priority is lower than a sixth priority, determining to use the first resource as the candidate resource; and when the fifth priority is higher than or is equal to the sixth priority, determining not to use the first resource as the candidate resource; wherein the fifth priority is the resource reserving priority indicated by the mapping parameter of the first data, and the sixth priority is the resource reserving priority indicated by the mapping parameter of the second data; the fifth priority being lower than the sixth priority is the signal quality value of the first data being lower than the signal quality threshold; and the fifth priority being higher than or being equal to the sixth priority is the signal quality value of the first data being higher than or being equal to the signal quality threshold.

10. The method according to claim 1, wherein the target information comprises the first information; and the according to the target information, determining whether to use the first resource as the candidate resource for transmitting the second data comprises:

when the first information is first preset information, determining to use the first resource as the candidate resource, wherein the resource reserving priority indicated by the first preset information is a lowest priority.

11. The method according to claim 1, wherein the target information comprises the second information; and the according to the target information, determining whether to use the first resource as the candidate resource for transmitting the second data comprises:

when the second information is second preset information, determining to use the first resource as the candidate resource, wherein the resource reserving priority indicated by the second preset information is a highest priority.

12. The method according to claim 1, wherein the method further comprises:

after determining the candidate resource, when the resource number K of candidate resources satisfies a target condition, determining N first resources of multiple first resources as the candidate resources, wherein the N first resources are resources occupied by N pieces of data that have a lowest service type priority and least interference; wherein the target condition is that a resource number of the candidate resources is less than a number threshold, wherein N=the number threshold-K; or the target condition is that a first ratio of the resource number of the candidate resources to a total number of resources is less than a ratio threshold, wherein N=total number of resources*(ratio threshold-K/total number of resources), and K and N are both positive integers.

13. The method according to claim 1, wherein the resource reserving priority of the first data or the second data is predefined in a communication protocol, or preconfigured by the UE or configured by the UE, or preconfigured by a network device or configured by a network device.

14. The method according to claim 1, wherein the service type of the first data is indicated by radio resource control signaling, sidelink control information, or downlink control information.

15. A User equipment (UE), comprising: a processor, a memory, and a computer program stored in the memory and executable on the processor, wherein when the computer program is executed by the processor, the following steps are implemented:

obtaining target information, wherein the target information comprises at least one of first information or second information, the first information is used to indicate a resource reserving priority of first data, the second information is used to indicate a resource reserving priority of second data, the first data is data that occupies a first resource, and the second data is to-be-transmitted data; and according to the target information, determining whether to use the first resource as a candidate resource for transmitting the second data, wherein the first information comprises at least one of the following: a service type of the first data, a quality of service (QoS) parameter of the first data, or a mapping parameter of the first data; the second information comprises at least one of the following: a service type of the second data, a QoS parameter of the second data, or a mapping parameter of the second data, wherein the mapping parameter of the first data is a signal quality value of the first data, and the mapping parameter of the second data is a signal quality threshold obtained by mapping the QoS parameter of the first data and the QoS parameter of the second data, wherein the service type is any one of the following: broadcast signaling, radio resource control signaling, broadcast service data, multicast service data, and unicast service data.

16. The UE according to claim 15, wherein comprises the first information and the second information, the first information comprises the service type of the first data, and the second information comprises the service type of the second data; and the according to the target information, determining whether to use the first resource as the candidate resource for transmitting the second data comprises:

when a first priority is lower than a second priority, determining to use the first resource as the candidate resource;

when the first priority is higher than the second priority, determining not to use the first resource as the candidate resource; and when the first priority is equal to the second priority, determining to use the first resource as the candidate resource, or determining not to use the first resource as the candidate resource; wherein the first priority is a resource reserving priority indicated by the service type of the first data, and the second priority is a resource reserving priority indicated by the service type of the second data.

17. A non-transitory computer-readable storage medium, wherein a computer program is stored in the non-transitory computer-readable storage medium, and the computer program, when executed by a processor, implements the following steps:

obtaining target information, wherein the target information comprises at least one of first information or second information, the first information is used to indicate a resource reserving priority of first data, the second information is used to indicate a resource reserving priority of second data, the first data is data that occupies a first resource, and the second data is to-be-transmitted data; and according to the target information, determining whether to use the first resource as a candidate resource for transmitting the second data, wherein the first information comprises at least one of the following: a service type of the first data, a quality of service (QoS) parameter of the first data, or mapping parameter of the first data; the second information comprises at least one of the following: a service type of the second data, a QoS parameter of the second data, or a mapping parameter of the second data, wherein the mapping parameter of the first data is a signal quality value of the first data and the mapping parameter of the second data is a signal quality threshold obtained by mapping the QoS parameter of the first data and the QoS parameter of the second data, wherein the service type is any one of the following: broadcast signaling, radio resource control signaling, broadcast service data, multicast service data, and unicast service data.

\* \* \* \* \*